(12) United States Patent
Kang

(10) Patent No.: US 12,210,963 B2
(45) Date of Patent: *Jan. 28, 2025

(54) NEURAL PROCESSOR WITH ACTIVATION COMPRESSION

(71) Applicant: Rebellions Inc., Seongnam-si (KR)

(72) Inventor: Minhoo Kang, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,906

(22) Filed: Jun. 16, 2023

(65) Prior Publication Data

US 2023/0334304 A1 Oct. 19, 2023

Related U.S. Application Data

(63) Continuation of application No. 17/821,903, filed on Aug. 24, 2022, now Pat. No. 11,734,552.

(30) Foreign Application Priority Data

Mar. 10, 2022 (KR) .......................... 10-2022-0030139

(51) Int. Cl.
*G06N 3/063* (2023.01)
(52) U.S. Cl.
CPC .................... *G06N 3/063* (2013.01)
(58) Field of Classification Search
CPC ....................................................... G06N 3/063
See application file for complete search history.

(56) References Cited

U.S. PATENT DOCUMENTS

2018/0046906 A1 2/2018 Dally et al.
2021/0004668 A1* 1/2021 Moshovos ............. G06N 3/045

OTHER PUBLICATIONS

Jang, Jun-Woo, et al. "Sparsity-aware and re-configurable NPU architecture for Samsung flagship mobile SoC." 2021 ACM/IEEE 48th Annual International Symposium on Computer Architecture (ISCA). IEEE, 2021. (Year: 2021).*
Zhou, Xuda, et al. "Cambricon-S: Addressing irregularity in sparse neural networks through a cooperative software/hardware approach." 2018 51st Annual IEEE/ACM International Symposium on Microarchitecture (MICRO). IEEE, 2018. (Year: 2018).*
Office Action for KR 10-2022-0030139 by Korean Intellectual Property Office dated May 9, 2024.
Jang, Jun-Woo et al. "Sparsity-Aware and Re-configurable NPU Architecture for Samsung Flagship Mobile SoC," 2021 ACM/IEEE 48th Annual International Symposium on Computer Architecture (ISCA).

* cited by examiner

*Primary Examiner* — Benjamin P Geib
(74) *Attorney, Agent, or Firm* — BROADVIEW IP LAW, PC

(57) ABSTRACT

A neural processing device is provided. The neural processing device comprises: an activation buffer in which first and second input activations are stored, an activation compressor configured to generate a first compressed input activation by using the first and second input activations, and a tensor unit configured to perform two-dimensional calculations using the first compressed input activation, wherein the first compressed input activation comprises first input row data comprising at least a portion of the first input activation and at least a portion of the second input activation, and first metadata corresponding to the first input row data.

19 Claims, 36 Drawing Sheets

NEURAL PROCESSOR WITH ACTIVATION COMPRESSION

CROSS-REFERENCE TO RELATED APPLICATION

This application is a Continuation Application of a currently pending U.S. patent application Ser. No. 17/821,903, filed on Aug. 24, 2022, which claims priority under 35 U.S.C § 119 to Korean Patent Application No. 10-2022-0030139 filed in the Korean Intellectual Property Office on Mar. 10, 2022, the entire contents of which are hereby incorporated by reference.

TECHNICAL FIELD

The disclosure relates to a neural processing device. Specifically, the disclosure relates to a neural processing device that prevents resource waste and minimizes latency.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

For deep-learning training and inference, multiplication calculations need to be performed repetitively. Multiplication calculations are performed in an internal tensor unit, and the tensor unit can be implemented in the form of an array that receives a plurality of input data and calculates them in parallel.

An artificial intelligence device can optimize the plurality of input data provided to the tensor unit through an activation function (e.g., a ReLu function) or pruning in order to reduce latency. At least some of the optimized input data may have a value of zero (0). Even if some of the optimized input data have a value of zero (0), the tensor unit still performs multiplication operations, which causes a waste of resources.

SUMMARY

Aspects of the disclosure provide a neural processing device that minimizes the waste of resources and minimizes latency.

According to some aspects of the disclosure, a neural processing device includes: an activation buffer in which first and second input activations are stored, an activation compressor configured to generate a first compressed input activation by using the first and second input activations, and a tensor unit configured to perform two-dimensional calculations using the first compressed input activation, wherein the first compressed input activation comprises first input row data comprising at least a portion of the first input activation and at least a portion of the second input activation, and first metadata corresponding to the first input row data.

According to some aspects, the first metadata includes a first source index including information on a source of the first input row data According to some aspects, the first input row data comprises a first data element, the first source index comprises a first source element corresponding to the first data element, and the first source element corresponds to one of the first and second input activations.

According to some aspects, the first metadata further includes a first operation index including information on a weight to be calculated with the first input row data.

According to some aspects, the first input activation includes a first input element that is an effective element and a second input element that is an ineffective element, the second input activation comprises a third input element that is an effective element, the activation compressor generates the first input row data by pushing the third input element to the second input element, and the first input row data comprises a first data element corresponding to the first input element and a second data element corresponding to the third input element.

According to some aspects, the first metadata includes a first source element corresponding to the first input element and a second source element corresponding to the second input element, and the first source element and the second source element have different values.

According to some aspects, a position of the second input element and a position of the third input element correspond to each other.

According to some aspects, a position of the second input element and a position of the third input element do not correspond to each other.

According to some aspects, the first metadata includes a first operation index including information on a weight with which each of the data elements included in the first input row data is calculated.

According to some aspects, the activation compressor generates the first input row data by sequentially pushing the third data element to the second data element.

According to some aspects, the activation buffer further stores third and fourth input activations therein, and the activation compressor: generates the first input row data and first preliminary input row data by using the first and second input activations, generates second input row data and second preliminary input row data by using the third and fourth input activations, and generates third input row data by using the first and second preliminary input row data.

According to some aspects, the first and second preliminary input row data are temporarily stored in the activation buffer.

According to some aspects, the neural processing device, further includes: a weight buffer in which first and second weight matrices are stored, and a weight compressor configured to generate a first compressed weight matrix by using the first and second weight matrices, wherein the first compressed weight matrix includes at least a portion of the first weight matrix and at least a portion of the second weight matrix.

According to some aspects, the neural processing device, further includes a vector unit configured to perform one-dimensional calculations, wherein the activation compressor generates first and second partial sums by using the first compressed input activation, and the first partial sum is provided to a first register of the vector unit, and the second partial sum is provided to a second register of the vector unit.

According to some aspects of the disclosure, a neural processing device includes: an activation buffer in which a first input activation including a first input element that is an ineffective element and a second input activation including a second input element that is an effective element are stored, an activation compressor configured to generate first input row data by pushing the second input element to the first input element, and generate a first source index corresponding to the first input row data, and a tensor unit configured to perform two-dimensional calculations by using the first input row data and the first source index.

According to some aspects, the first input row data includes a first data element corresponding to the second input element, and the first source index includes a first source element corresponding to the first data element.

According to some aspects, the first source element includes information that the first data element has originated from the second input activation.

According to some aspects, the activation compressor generates a first operation index including information on a weight with which the first input row data are to be calculated.

According to some aspects of the disclosure, a neural processing device includes: a L0 memory configured to store first partial sum data, a buffer in which first and second data are stored, a compressor configured to generate first compressed data and metadata associated with the first compressed data by using the first and second data, a tensor unit configured to generate second partial sum data by using the first compressed data and the metadata, and a vector unit configured to receive the first partial sum data from the L0 memory, to receive the second partial sum data from the tensor unit, and to generate an output activation by using the first and second partial sum data, wherein the first compressed data includes at least a portion of the first data and at least a portion of the second data, and the metadata includes information on a source of the first compressed data.

According to some aspects, the metadata further includes information on the calculation of the first compressed data.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

Since the neural processing device of the disclosure minimizes unnecessary calculations by performing compression on the input data, it is possible to prevent resource waste of the neural processing device and minimize latency.

The neural processing device of the disclosure can reduce the number of calculations by performing compression on the input activation and/or weight matrix inputted to the tensor unit, thereby making it possible to prevent resource waste of the tensor unit and minimize latency.

In addition to the foregoing, the specific effects of the disclosure will be described together while elucidating the specific details for carrying out the embodiments below.

DETAILED DESCRIPTION OF THE PREFERRED EMBODIMENTS

Figure 1:
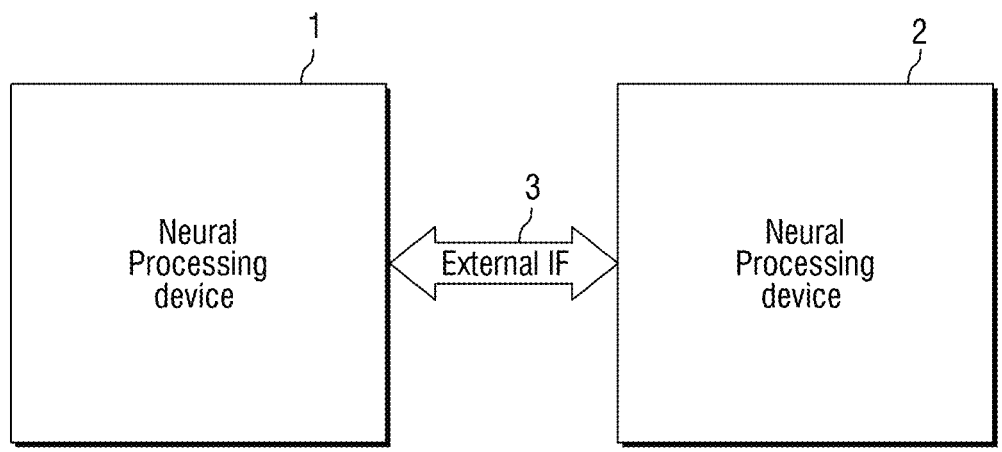
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

When a part is said to include "at least one of a, b or c", this means that the part may include only a, only b, only c, both a and b, both a and c, both b and c, all of a, b and c, or variations thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

In the following, a neural processing device in accordance with some embodiments will be described with reference to FIGS. 1 to 26.

FIG. 1 is a block diagram for illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 2:
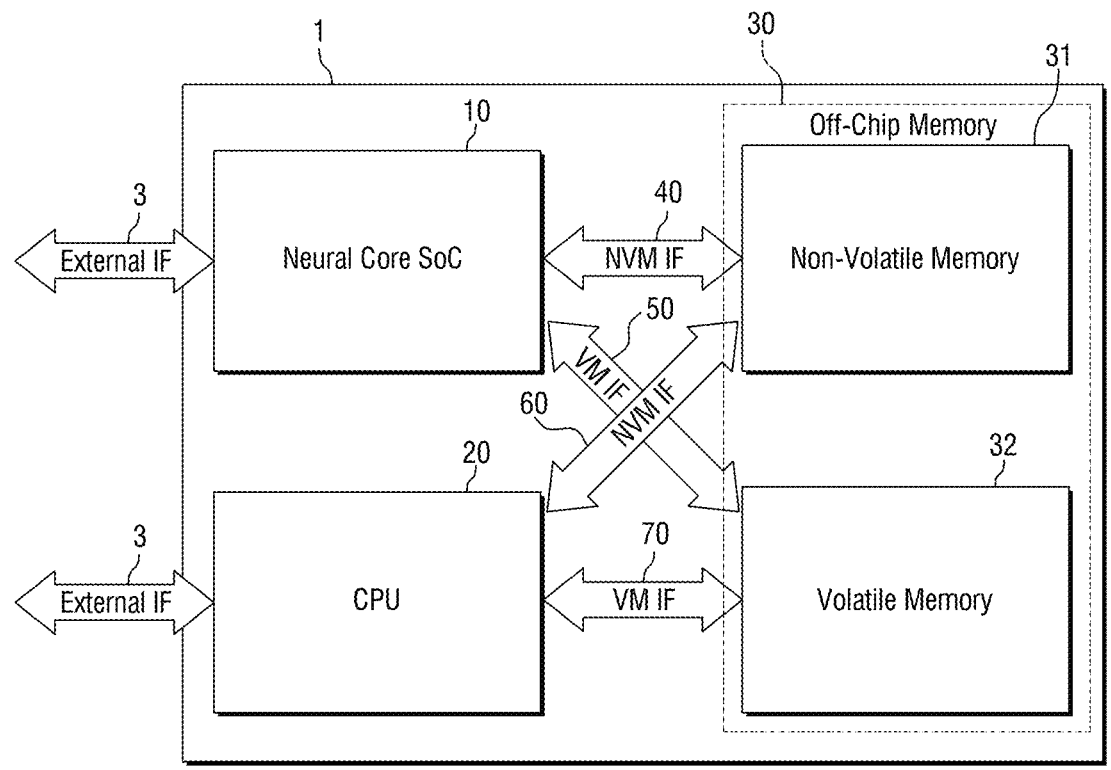
FIG. 2 is a block diagram for illustrating the neural processing device of FIG. 1.

FIG. 2 is a block diagram for illustrating the neural processing device of FIG. 1.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation device and may be an accelerator. The neural core SoC 10 may be, for example, any one of a graphics processing unit (GPU), a field-programmable gate array (FPGA), and an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are used a lot in deep learning. Accordingly, there can be high efficiency by performing calculations in deep learning inference and training tasks by the neural core SoC 10.

The CPU 20 may exchange data with other external calculation devices via the external interface 3. In addition, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
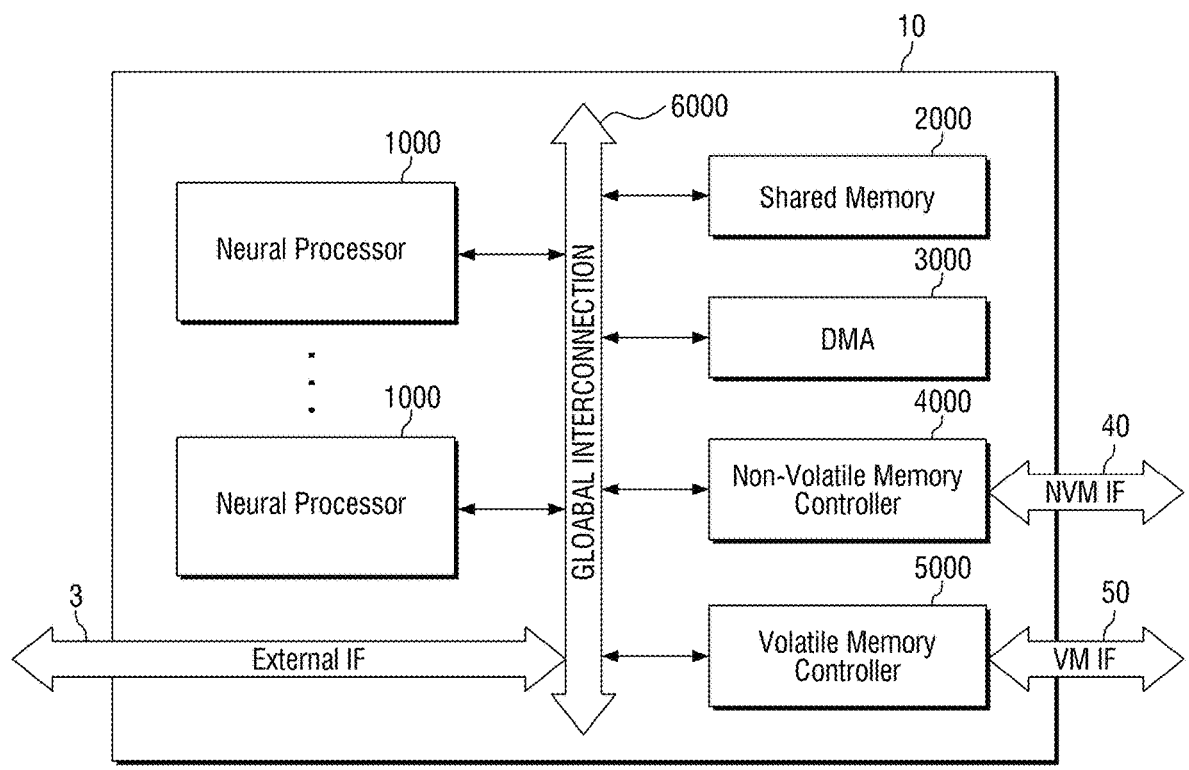
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the non-volatile memory 31 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device in accordance with some embodiments, the scheduling task is also performed by the individual neural processors 1000, and thus, the performance of the device can be improved without even a scheduling burden resulting therefrom.

Figure 4:
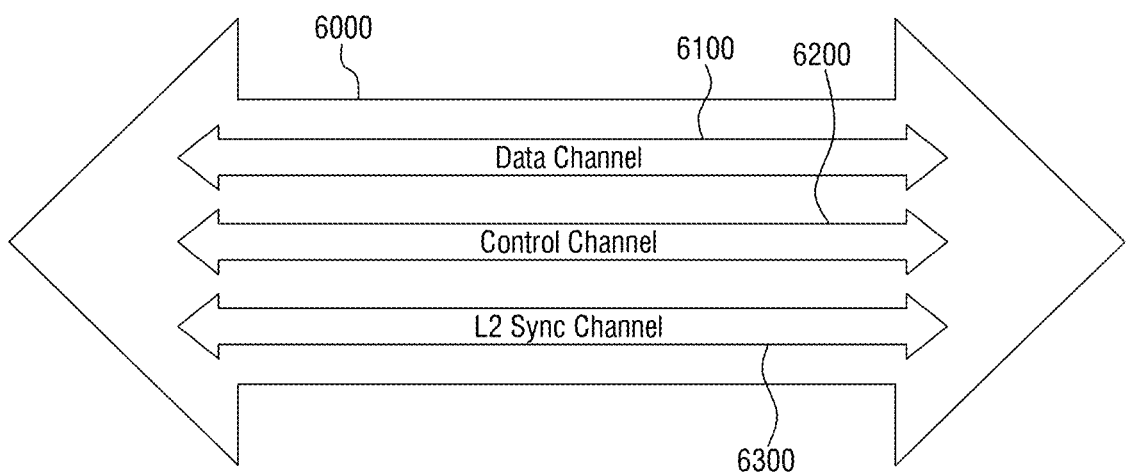
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
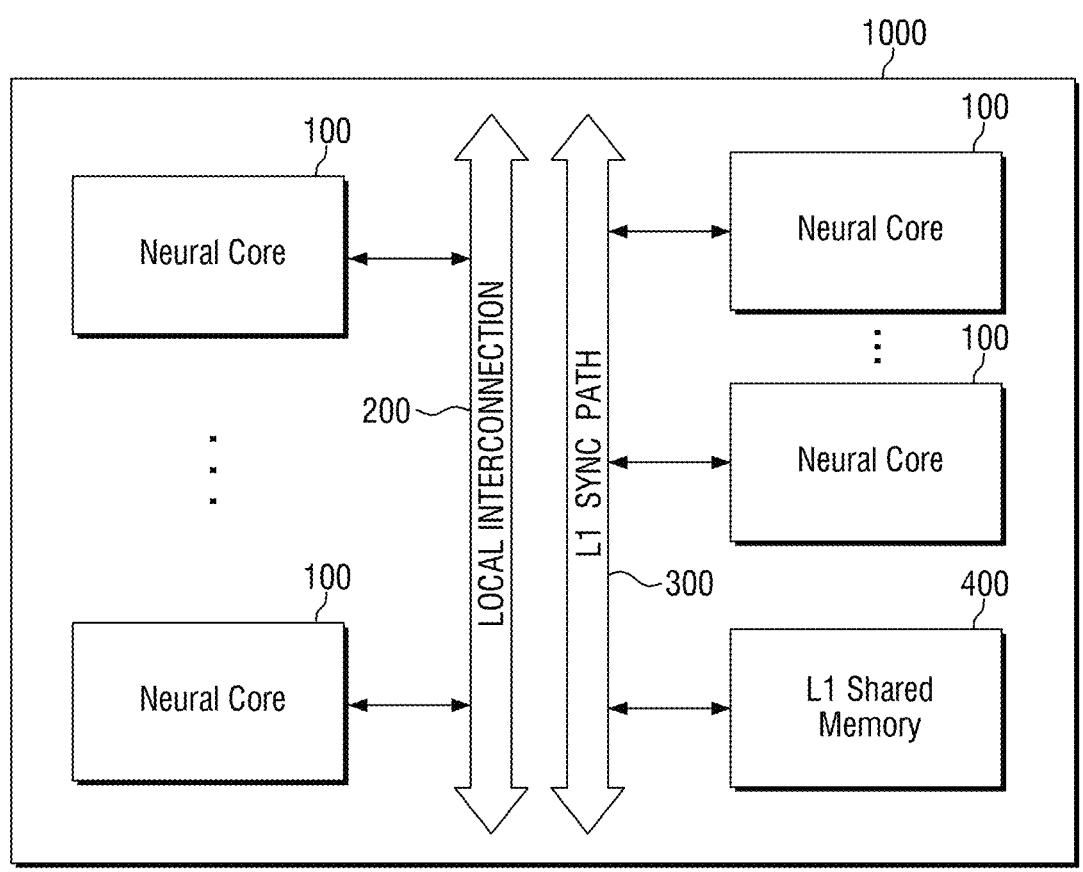
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L1 shared memory 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. That is, the neural processor 1000 may be configured with only one neural core.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The local interconnection 200 may connect the at least one neural core 100 and the L1 shared memory 400 to each other. The local interconnection 200 may be a path through which data travels between the at least one neural core 100 and the L1 shared memory 400. The local interconnection 200 may be connected and transmit data to the global interconnection 6000 of FIG. 3.

The L1 sync path 300 may connect the at least one neural core 100 and the L1 shared memory 400 to each other. The L1 sync path 300 may be a path through which synchronization signals of the at least one neural core 100 and the L1 shared memory 400 travel.

Figure 6:
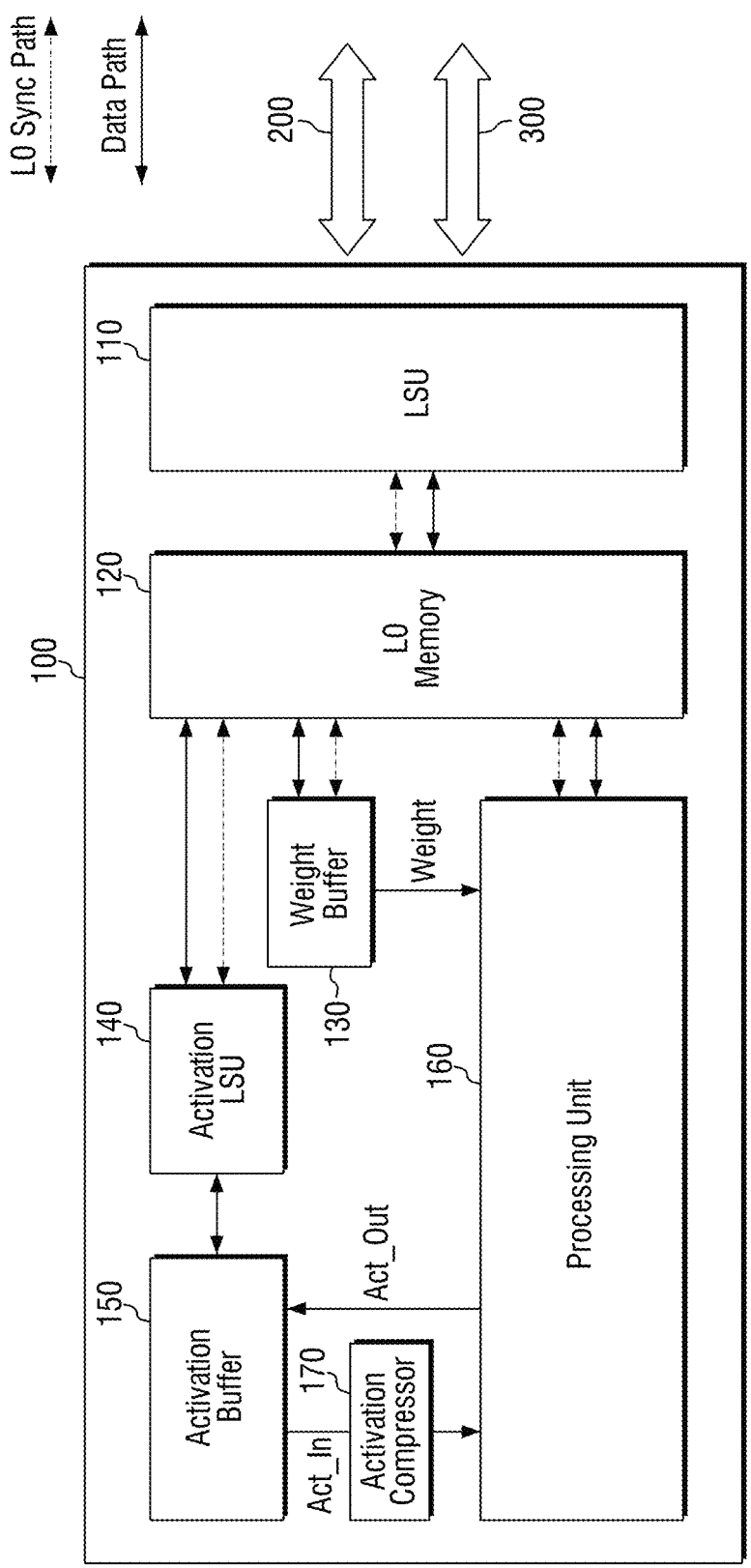
FIG. 6 is a block diagram for illustrating the neural core of FIG. 5 in detail.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000. FIG. 6 is a block diagram for illustrating the neural core of FIG. 5 in detail.

Referring to FIG. 6, the neural core 100 may include a load/store unit (LSU) 110, a L0 memory 120, a weight buffer 130, an activation LSU 140, an activation buffer 150, a processing unit 160, and an activation compressor 170.

The LSU 110 may receive at least one of data, a control signal, or a synchronization signal from the outside through the local interconnection 200 and the L1 sync path 300. The LSU 110 may transmit at least one of the received data, the received control signal, or the received synchronization signal to the L0 memory 120. Similarly, the LSU 110 may transmit at least one of the data, the control signal, or the synchronization signal to the outside through the local interconnection 200 and the L1 sync path 300.

Figure 7:
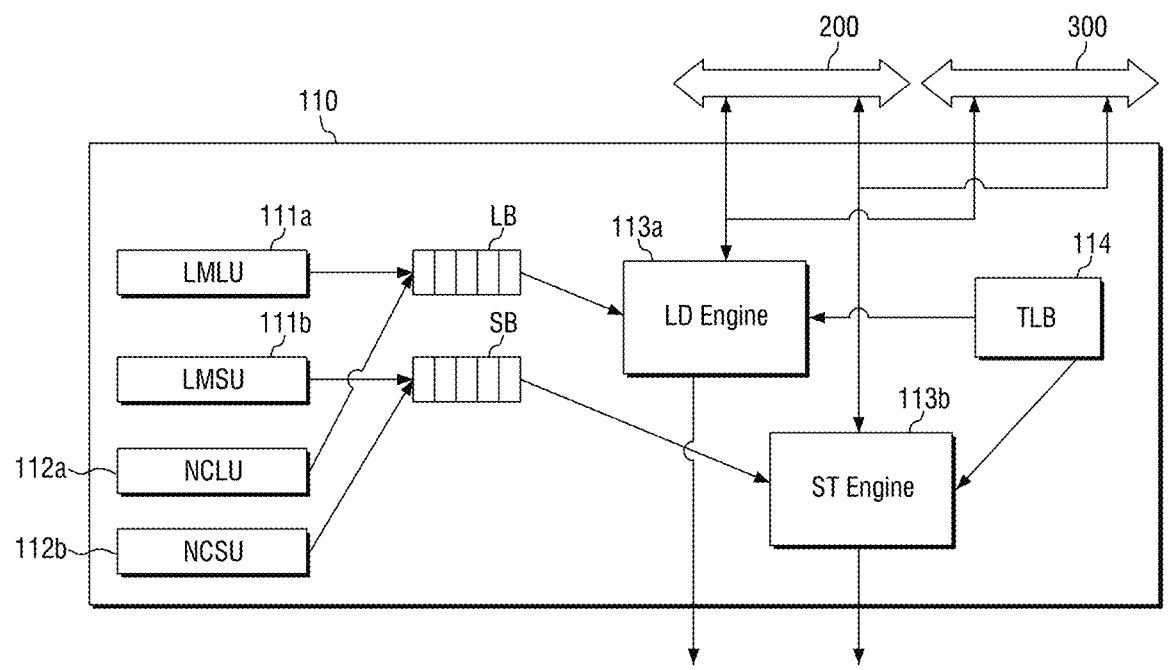
FIG. 7 is a block diagram for illustrating the LSU of FIG. 6.

FIG. 7 is a block diagram illustrating an operation of the LSU of FIG. 6.

Referring to FIG. 7, the LSU 110 may include a local memory load unit (LMLU) 111*a*, a local memory store unit (LMSU) 111*b*, a neural core load unit (NCLU) 112*a*, a neural core store unit (NCSU) 112*b*, a load buffer LB, a store buffer SB, a load (LD) engine 113*a*, a store (ST) engine 113*b*, and a translation lookaside buffer (TLB) 114.

The local memory load unit 111*a* may fetch a load instruction for the L0 memory 120 and issue the load instruction. When the local memory load unit 111*a* provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L1 sync path 300. At this time, the synchronization signal may indicate that the task has been completed.

Referring to FIG. 6 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a tensor unit 163 and a vector unit 164.

The L0 memory 120 may be a memory associated with the neural core level, i.e., level 0 (L0). The L0 memory may not be shared but be a private memory of the neural core, unlike the L1 shared memory 400 and the L2 shared memory, i.e., the shared memory 2000.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network, respectively. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is updated in the deep learning training stage, and may be used to derive the output activation Act_Out via the updated value in the inference stage.

The activation LSU 140 may transfer the input activation Act_In from the L0 memory 120 to the activation buffer 150, and the output activation Act_Out from the activation buffer 150 to the L0 memory 120. In other words, the activation LSU 140 may perform both a load task and a store task of the activation.

The activation buffer 150 may provide the input activation Act_In to the processing unit 160 through the activation compressor 170. In other words, the activation buffer 150 may provide the input activation Act_In to the activation compressor 170, and the activation compressor 170 may generate a compressed input activation by using the input activation Act_In. The compressed input activation may be provided to the processing unit 160. The compressed input activation may include at least some of a plurality of input activations. A specific description thereof will be given later.

The activation buffer 150 may receive the output activation Act_Out from the processing unit 160. The activation buffer 150 may temporarily store the input activation Act_In and the output activation Act_Out.

The activation buffer 150 may quickly provide the activation to the processing unit 160, in particular, the tensor unit 163, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive a compressed input activation, multiply it by a weight, and then add it to generate an output activation Act_Out.

The activation compressor 170 may compress the input activation Act_In and thereby generate a compressed input activation having increased calculation efficiency. The compressed input activation may be relatively higher in the density of elements than the input activation Act_In. Being relatively higher in the density of elements means that there are relatively more elements with non-zero values. A specific description of the activation compressor 170 will be given later.

Figure 8:
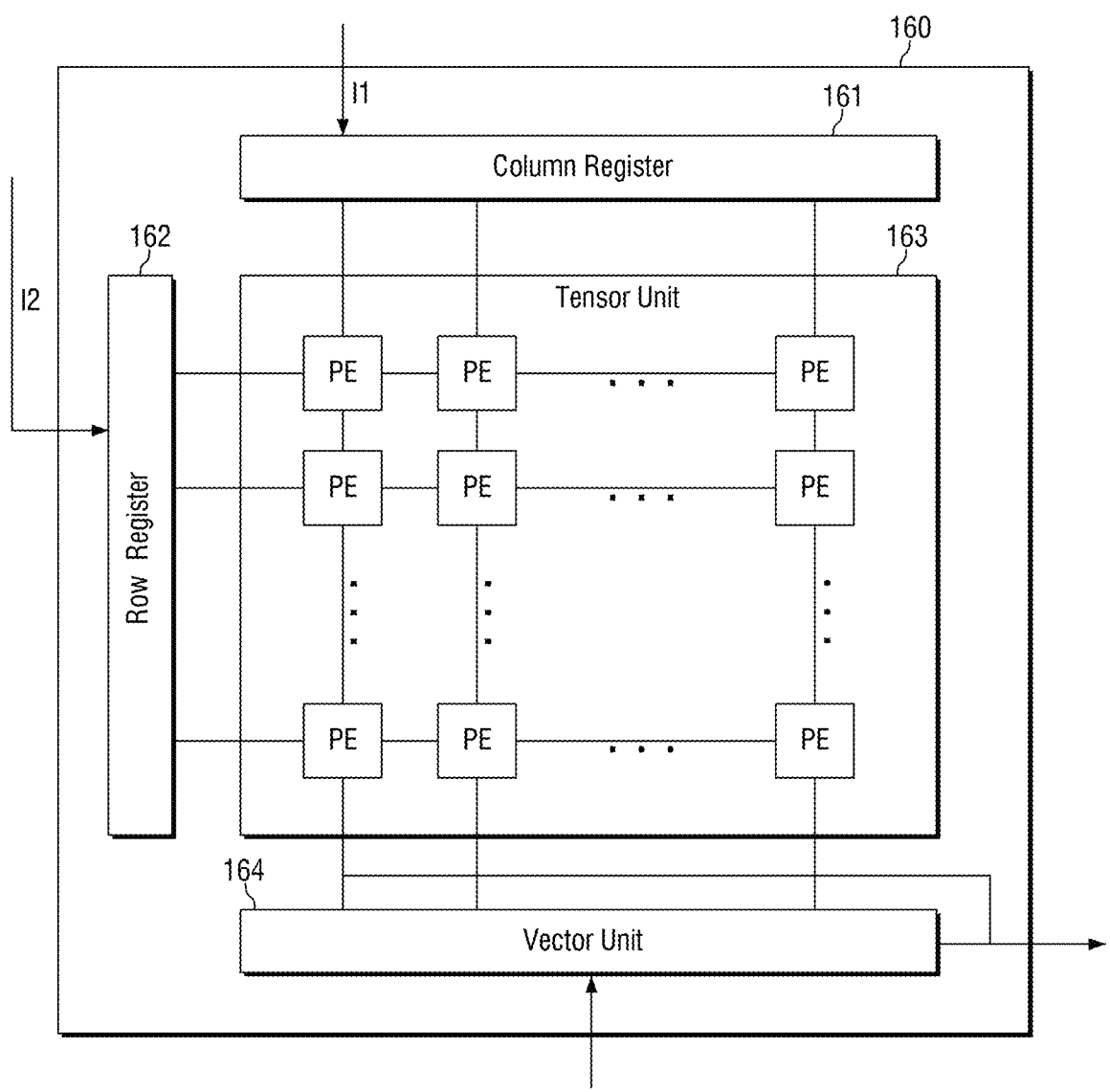
FIG. 8 is a block diagram for illustrating the processing unit of FIG. 6 in detail.

FIG. 8 is a block diagram for illustrating the processing unit of FIG. 6 in detail.

Referring to FIGS. 6 and 8, the processing unit 160 may include a tensor unit 163, a vector unit 164, a column register 161, and a row register 162.

The tensor unit 163 may receive a compressed input activation and a weight and perform multiplication on them. In this case, the compressed input activation and the weight may each be in the form of matrices and calculated via convolution. Through this, the tensor unit 163 may generate an output activation Act_Out. However, the embodiment is not limited thereto. The tensor unit 163 may generate any number of other types of outputs other than the output activation Act_Out as well.

The tensor unit 163 may include at least one processing element PE. The processing elements PE may be aligned with each other and may each perform multiplications on the elements of one compressed input activation and the elements of one weight.

The tensor unit 163 may generate a partial sum obtained by summing the values for each multiplication. This partial sum may be utilized as an output activation Act_Out. The tensor unit 163 performs two-dimensional matrix multiplication, and thus, may be referred to as a 2D matrix compute unit.

The vector unit 164 may mainly perform one-dimensional calculations. The vector unit 164 may perform deep learning calculations together with the tensor unit 163. Through this, the processing unit 160 may be specialized in necessary calculations. In other words, the neural core 100 has calculation modules that perform a large amount of two-dimensional matrix multiplications and one-dimensional calculations, respectively, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be the compressed input activation or the weight. The second input I2 may be a value other than the first input I1 out of the compressed input activation or the weight. Alternatively, the first input I1 and the second input I2 may be values other than the compressed input activation and the weight.

Figure 9:
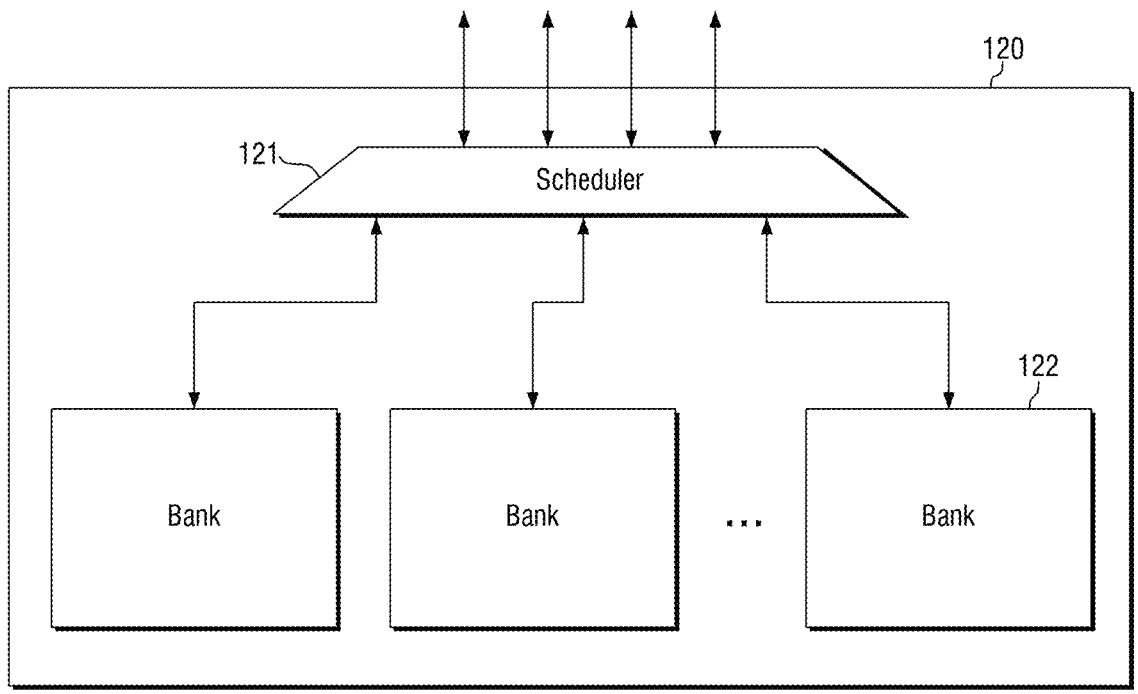
FIG. 9 is a block diagram for illustrating the L0 memory of FIG. 6.

FIG. 9 is a block diagram specifically illustrating the L0 memory of FIG. 6.

Referring to FIG. 9, the L0 memory 120 may include a scheduler 121 and one or more local memory banks 122.

When data are stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data are loaded from the L0 memory 120, the scheduler 121 may receive the data from the local memory bank 122 and transmit the data to the store engine 113b. The store engine 113b may store the data in the outside through the local interconnection 200.

Figure 10:
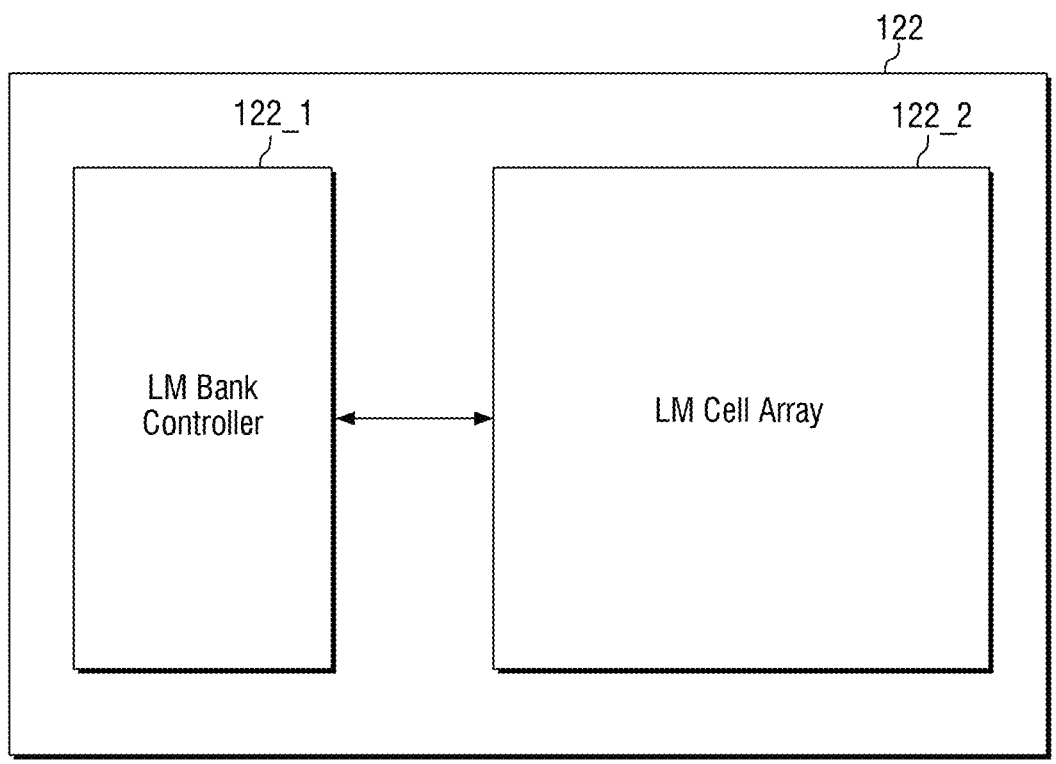
FIG. 10 is a block diagram for illustrating the local memory bank of FIG. 9.

FIG. 10 is a block diagram for illustrating the L0 memory bank of FIG. 9.

Referring to FIG. 10, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 1222 may be of a structure in which cells in which data is directly stored are arranged in rows and columns. The local memory bank cell array 122_2 may be controlled by the local memory bank controller 122_1.

Figure 11:
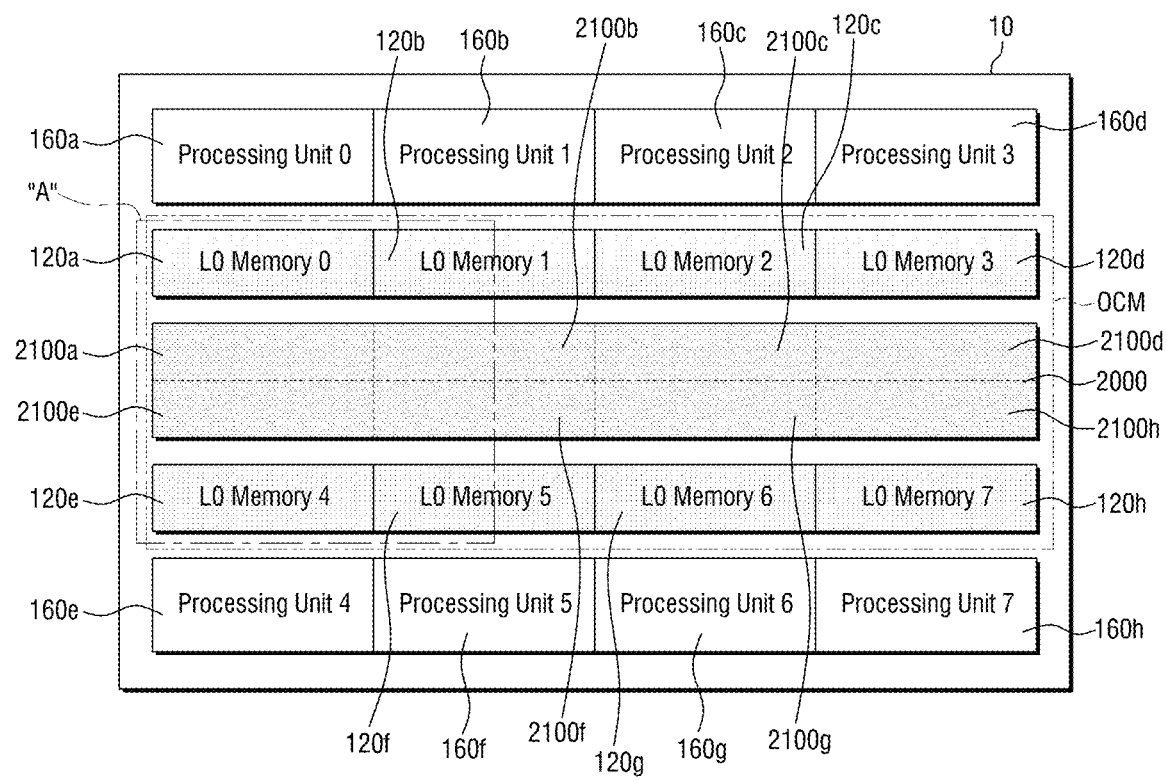
FIG. 11 is a block diagram for illustrating memory reconstruction of a neural processing system in accordance with some embodiments of the disclosure.

FIG. 11 is a block diagram for illustrating memory reconstruction of a neural processing system in accordance with some embodiments of the disclosure.

Referring to FIG. 11, the neural core SoC 10 may include first to eighth processing units 160a to 160h and an on-chip memory OCM. Although FIG. 11 illustrates eight processing units as an example, this is merely illustrative, and the number of processing units may vary as desired.

The on-chip memory OCM may include first to eighth L0 memories 120a to 120h and the shared memory 2000.

The first to eighth L0 memories 120a to 120h may be used as private memories of the first to eighth processing units 160a to 160h, respectively. That is, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight and may be equal to the number of processing units and the number of L0 memories.

The shared memory 2000 may operate in one of two types of on-chip memory formats. That is, the shared memory 2000 may operate in either an L0 memory format or a global memory format. That is, the shared memory 2000 may implement two types of logical memories with one piece of hardware.

When the shared memory 2000 is implemented in the L0 memory format, the shared memory 2000 may operate as a private memory is a private memory of each of the first to eighth processing units 160a to 160h like the first to eighth L0 memories 120a to 120h. The L0 memory may operate at a relatively high speed compared to the global memory, and the shared memory 2000 may also use a relatively faster clock when operating in the L0 memory format.

When the shared memory 2000 is implemented in the global memory format, the shared memory 2000 may operate as a common memory used by the first processing unit 160a and the second processing unit 160b. In this case, the shared memory 2000 may be shared not only by the first to eighth processing units 160a to 160h but also by the first to eighth L0 memories 120a to 120h.

The global memory may generally use a lower clock than the L0 memory but is not limited thereto. When the shared memory 2000 operates in a global memory format, the first to eighth processing units 160a to 160h may share the shared memory 2000. In this case, the shared memory 2000 may be connected to the volatile memory 32 of FIG. 2 through the global interconnection 6000 and may operate as a buffer of the volatile memory 32.

At least a part of the shared memory 2000 may operate in the L0 memory format, and the others may operate in the global memory format. That is, the entire shared memory 2000 may operate in the L0 memory format, or the entire shared memory 2000 may operate in the global memory format. Alternatively, a part of the shared memory 2000 may operate in the L0 memory format, and the others may operate in the global memory format.

Figure 12:
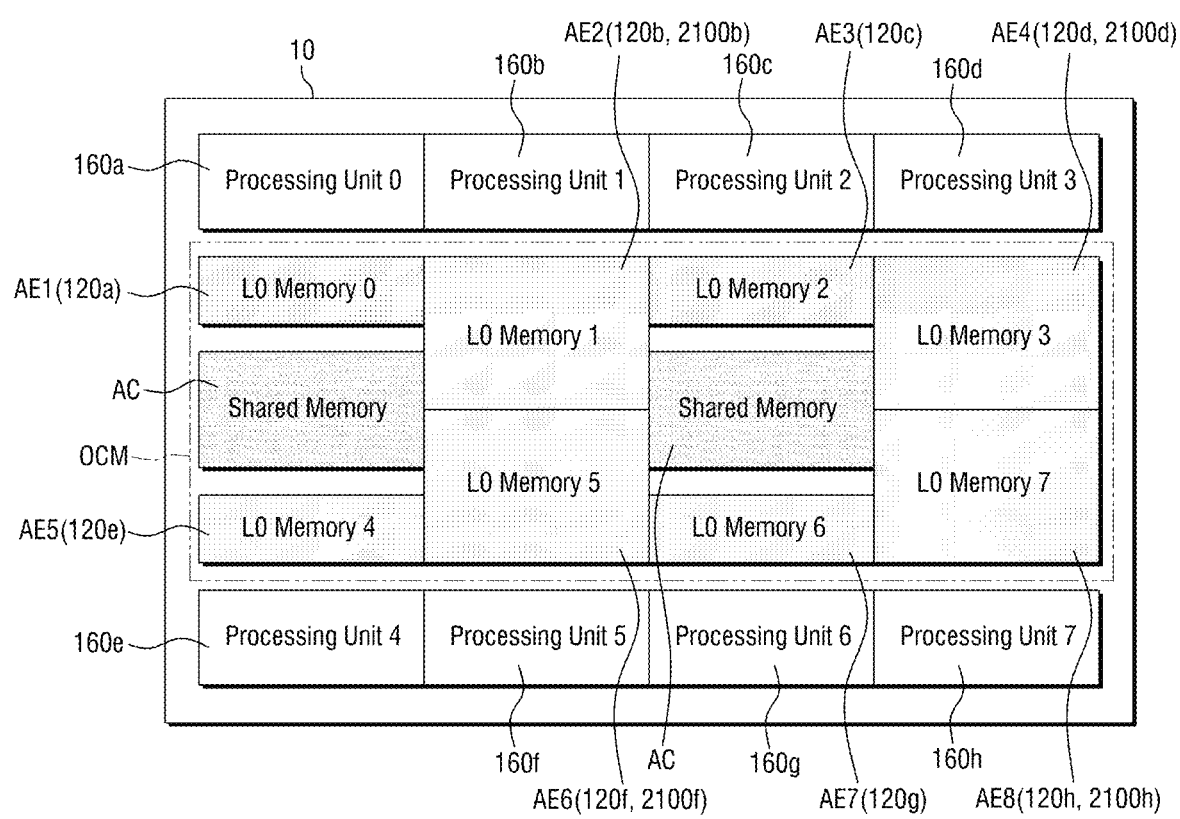
FIG. 12 is a block diagram showing an example of memory reconstruction of a neural processing system in accordance with some embodiments of the disclosure.

FIG. 12 is a block diagram illustrating an example of memory reconfiguration of a neural processing system in accordance with some embodiments of the disclosure.

Referring to FIGS. 11 and 12, first, third, fifth, and seventh private areas AE1, AE3, AE5, and AE7 of the first, third, fifth, and seventh processing units 160a, 160c, 160e, and 160g may respectively include the first, third, fifth, and seventh L0 memories 120a, 120c, 120e, and 120g. In addition, second, fourth, sixth, and eighth private areas AE2, AE4, AE6, AE8 of the second, fourth, sixth, and eighth processing units 160b, 160d, 160f, and 160h may respectively include the second, fourth, sixth, and eighth L0 memories 120b, 120d, 120f, and 120h. In addition, the second, fourth, sixth, and eighth private areas AE2, AE4, AE6, and AE8 may include second, fourth, sixth, and eighth memory units 2100b, 2100d, 2100f, and 2100h. First, third, fifth, and seventh memory units 2100a, 2100c, 2100e, and 2100g of the shared memory 2000 may be used as a common area AC.

The common area AC may be shared by the first to eighth processing units 160a to 160h. The second private area AE2 may include the second L0 memory 120b and the second memory unit 2100b. The second private area AE2 may be an area in which the second L0 memory 120b and the second memory unit 2100b, that are separated in hardware, operate in the same manner to logically operate as one L0 memory. The fourth, sixth, and eighth private areas AE4, AE6, and AE8 may also operate in the same manner as the second private area AE2.

The shared memory 2000 according to the embodiment may convert an area corresponding to each processing unit into a logical L0 memory and a logical global memory in an optimized ratio. The shared memory 2000 may perform a ratio adjustment at run time.

That is, each processing unit may perform the same operation in some cases but may perform different operations in other cases. In this case, capacities of the L0 memory and the global memory required for an operation performed by each processing unit are inevitably different every time. Accordingly, when a composition ratio between the L0 memory and the shared memory is set to be fixed as in the known on-chip memory, a calculation assigned to each processing unit may be inefficiently performed.

Accordingly, the shared memory 2000 of the neural processing device according to the embodiment may set an optimal ratio between the L0 memory and the global memory according to the calculation during run time, and thus, efficiency and speed of an operation may increase.

Figure 13:
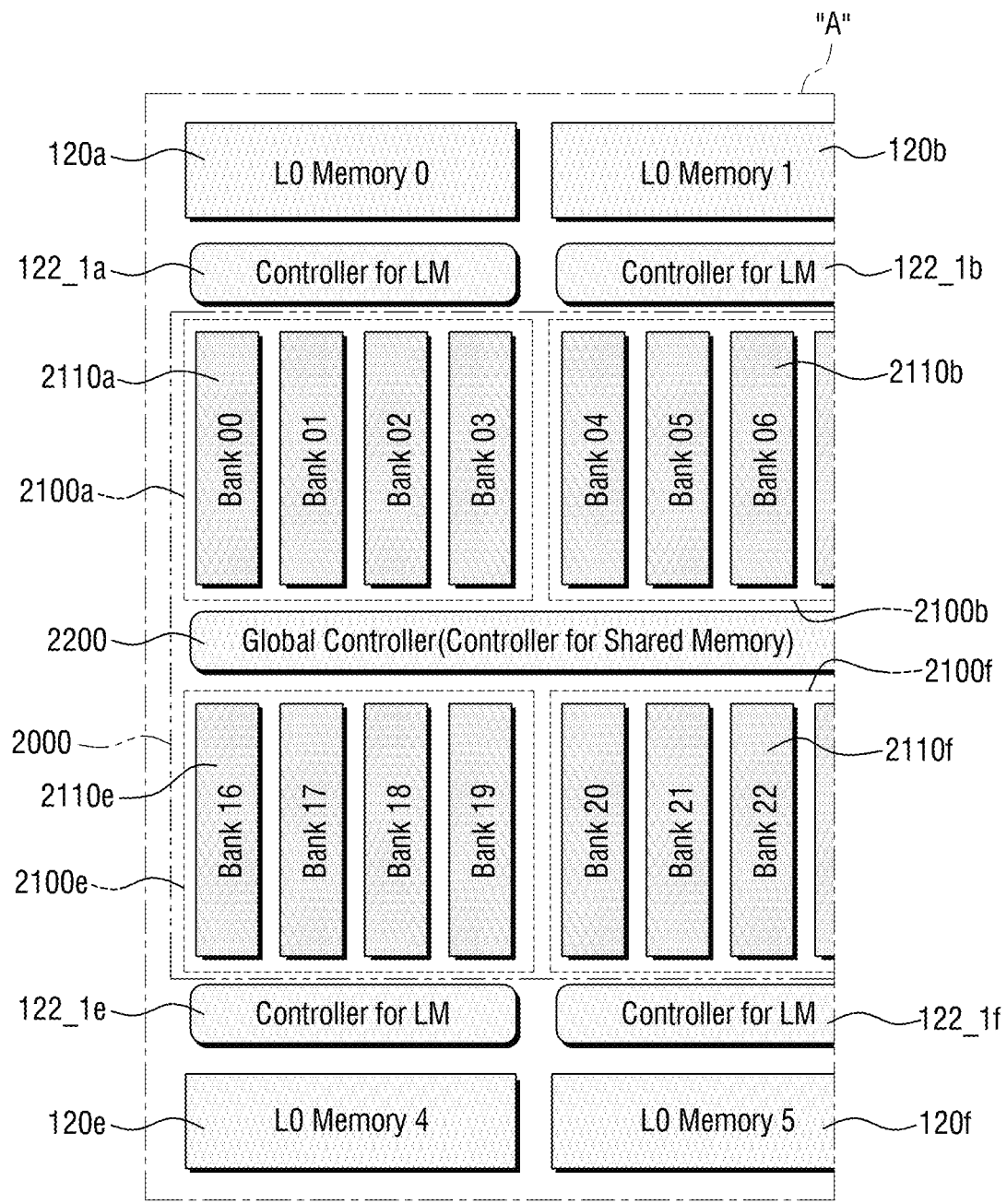
FIG. 13 is an enlarged block diagram of a portion A of FIG. 11.

FIG. 13 is an enlarged block diagram of a portion A of FIG. 11.

Referring to FIGS. 11 and 13, the shared memory 2000 may include a first L0 memory controller 122_1a, a second L0 memory controller 122_1b, a fifth L0 memory controller 122_1e, and a sixth L0 memory controller 122_1f, first to eighth memory units 2100a to 2100h, and a global controller 2200. Other L0 memory controllers not illustrated therein may also be included in the embodiment, but descriptions thereof are omitted for the sake of convenience.

The first L0 memory controller 122_1a may control the first L0 memory 120a. Also, the first L0 memory controller 122_1a may control the first memory unit 2100a. Specifically, when the first memory unit 2100a is implemented in a logical L0 memory format, the first L0 memory controller 122_1a may control the first memory unit 2100a.

The second L0 memory controller 122_1b may control the second L0 memory 120b. Also, the second L0 memory controller 122_1b may control the second memory unit 2100b. That is, when the second memory unit 2100b is implemented in a logical L0 memory format, the first L0 memory controller 122_1a may control the second memory unit 2100b.

The fifth L0 memory controller 122_1e may control the fifth L0 memory 120e. Also, the fifth L0 memory controller 122_1e may control the fifth memory unit 2100e. That is, when the fifth memory unit 2100e is implemented in a logical L0 memory format, the fifth L0 memory controller 122_1e may control the fifth memory unit 2100e.

The sixth L0 memory controller 122_1f may control the sixth L0 memory 120f. Also, the sixth L0 memory controller 122_1f may control the sixth memory unit 2100f. That is, when the sixth memory unit 2100f is implemented in a logical L0 memory format, the sixth L0 memory controller 122_1f may control the sixth memory unit 2100f.

The global controller 2200 may control all of the first to eighth memory units 2100a to 2100h. Specifically, when the first to eighth memory units 2100a to 2100h logically operate in a global memory format (that is, when not logically operating in the L0 memory format), the global controller 2200 may control the first memory unit to the eighth memory unit 2100a to 2100h.

That is, the first to eighth memory units 2100a to 2100h may be controlled by the first to eighth L0 memory controllers 122_1a to 122_1h or the global controller 2200 depending on types of memories that are logically implemented.

When the L0 memory controllers including the first, second, fifth, and sixth L0 memory controllers 122_1a, 122_1b, 122_1e, and 122_1f control the first to eighth memory units 2100a to 2100h, the first to eighth L0 memory controllers 122_1a to 122_1h control the first to eighth memory units 2100a to 2100h in the same manner as the first to eighth L0 memories 120a to 120h, and thus, the first to eighth memory units 2100a to 2100h may be controlled as private memories of the first to eighth processing units 160a to 160h. Accordingly, the first to eighth memory units 2100a to 2100h may operate at clock frequencies corresponding to clock frequencies of the first to eighth processing units 160a to 160h.

L0 memory controllers including the first L0 memory controller 122_1a, the second L0 memory controller 122_1b, the fifth L0 memory controller 122_1e, and the sixth L0 memory controller 122_1f may each include the LSU 110 of FIG. 6.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 13 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may logically operate in the L0 memory format or logically operate in the global memory format. In this case, the first memory bank 2110a may also operate independently of other memory banks in the first memory unit 2100a. However, the embodiment is not limited thereto.

When the memory banks operate independently, the first memory unit 2100a may include a first area operating in the same manner as the first L0 memory 120a and a second area operating in a different manner from the first L0 memory 120a. In this case, the first area and the second area do not necessarily coexist, and any one area may occupy all of the first memory unit 2100a.

Similarly, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy all of the first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, the known system-on-chip has a configuration in which an on-chip memory except for a high-speed L0 memory is composed of a high-density low-power static random access memory (SRAM). This is because the SRAM has high efficiency in terms of chip area and power consumption for required capacity. However, when more data is needed faster than the data required by capacity of a predetermined L0 memory, a processing speed of the known on-chip memory is inevitably slowed down significantly, and even when a global memory is not needed, there is no way to utilize the remaining global memory, resulting in inefficiency.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 according to the embodiment may acquire an optimal memory configuration ratio according to a calculation during run time to perform faster and more efficient operation. In a processing unit specialized in artificial intelligence, required sizes of the L0 memory and global memory may change in units of specific application. Furthermore, when a deep learning network is used in the same application, the required sizes of the L0 memory and the global memory may be different for each layer. In the shared memory 2000 according to the embodiment, the memory configuration ratio may be changed during run time even when a calculation step according to each layer is changed, and thus, a fast and efficient deep learning operation may be performed.

Figure 14:
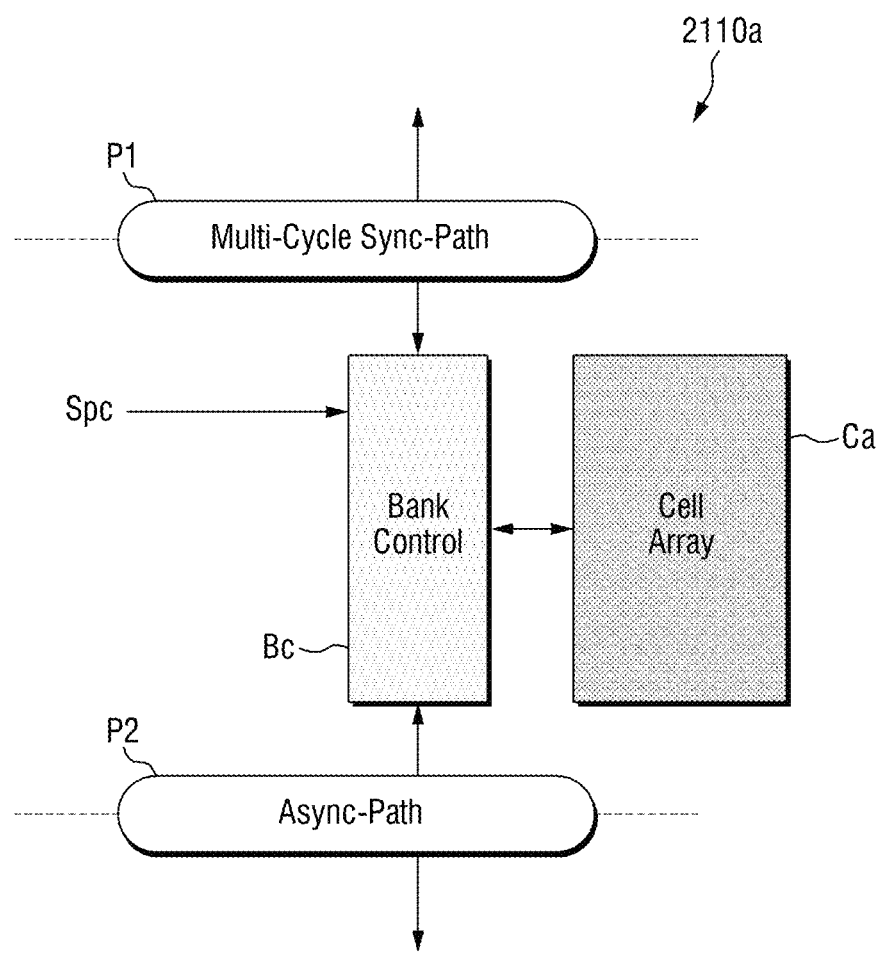
FIG. 14 is a diagram for illustrating the first memory bank of FIG. 13.

FIG. 14 is a diagram for illustrating the first memory bank of FIG. 13. Although FIG. 14 illustrates the first memory bank 2110a, other memory banks may also have the same structure as the first memory bank 2110a.

Referring to FIG. 14, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160*a* may exchange data directly with the first L0 memory 120*a*, and the first processing unit 160*a* may exchange data via the first path unit P1 when the shared memory 2000 is implemented logically in the L0 memory type. The first path unit P1 may include L0 memory controllers including the first L0 memory controller 122_1*a* and the second L0 memory controller 122_1*b* as shown in FIG. 13.

The first path unit P1 may form a multi-cycle sync-path. In other words, the operating clock frequency of the first path unit P1 may be the same as the operating clock frequency of the first processing unit 160*a*. The first L0 memory 120*a* may quickly exchange data at the same clock frequency as the operating clock frequency of the first processing unit 160*a* in order to quickly exchange data at the same speed as the operation of the first processing unit 160*a*. Likewise, the first path unit P1 may also operate at the same clock frequency as the operating clock frequency of the first processing unit 160*a*.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 14, the operating clock frequency of the first path unit P1 may be 1.5 GHz, as an example. This may be twice the frequency of 750 MHz of the bank controller Bc. However, the embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160*a* not directly but via the global interconnection 6000. In other words, the first processing unit 160*a* may exchange data with the cell array Ca via the global interconnection 6000 and the second path unit P2. In this case, the cell array Ca may exchange data not only with the first processing unit 160*a* but also with other processing units.

In other words, the second path unit P2 may be a data exchange path between the cell array Ca and all the processing units when the first memory bank 2110*a* is implemented logically in the global memory type. The second path unit P2 may include the global controller 2200 of FIG. 13.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to exist for each memory bank. In other words, the bank controller Bc is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIGS. 13 and 14, if the first memory unit 2100*a* exchanges data via the first path unit P1, the first address system may be used. If the first memory unit 2100*a* exchanges data via the second path unit P2, the second address system may be used. Similarly, if the second memory unit 2100*b* exchanges data via the first path unit P1, a third address system may be used. If the second memory unit 2100*b* exchanges data via the second path unit P2, the second address system may be used. In this case, the first address system and the third address system may be the same as each other. However, the embodiment is not limited thereto.

The first address system and the third address system may each be used exclusively for the first processing unit 160*a* and the second processing unit 160*b*, respectively. The second address system may be commonly applied to the first processing unit 160*a* and the second processing unit 160*b*.

In FIG. 14, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 15:
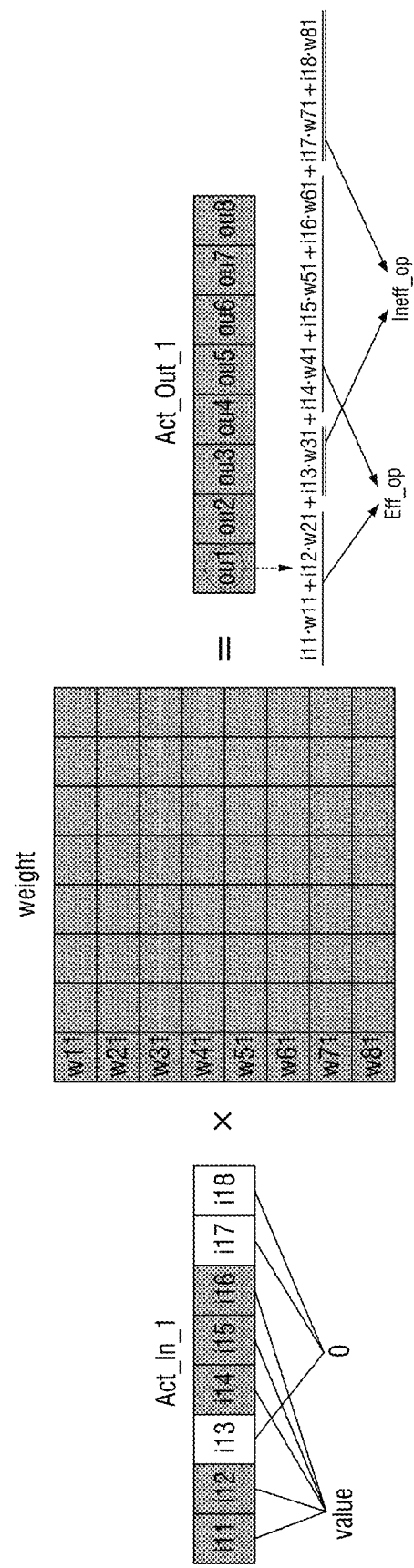
FIG. 15 is a diagram for briefly illustrating a calculation process of a tensor unit in an environment without an activation compressor.

FIG. 15 is a diagram for briefly illustrating a calculation process of a tensor unit in an environment without an activation compressor.

Referring to FIGS. 6 and 15, the processing unit 160 may receive a first input activation Act_In_1 from the activation buffer 150. The first input activation Act_In_1 may include input element 1-1 i11 to input element 1-8 i18. In other words, the first input activation Act_In_1 may include eight elements. However, embodiments are not limited thereto, and as a matter of course, the input activation Act_In may include any number of elements other than eight elements. In other words, the form of the input activation Act_In can be modified in various ways according to the design of the processing unit 160, and those of ordinary skill in the art of the disclosure may be able to apply various forms of input activation Act_In according to the design of the processing unit 160 without departing from the scope of the disclosure. For example, the input activation Act_In may include 64 elements, and an element group may be formed for every eight (8) elements. In other words, the input activation Act_In may include eight (8) element groups, and each element group may include eight (8) elements. In the following, each of the input activations Act_In will be described as including 8 or 64 elements, which is, however, merely for the convenience of description and does not limit the scope of the disclosure.

Input element 1-1 i11, input element 1-2 i12, input element 1-4 i14, input element 1-5 i15, and input element 1-6 i16 may each have a non-zero value. On the other hand, input element 1-3 i13, input element 1-7 i17, and input element 1-8 i18 may each have a value of 0. In the following, for the convenience of description, elements having a non-zero value are defined as 'effective elements,' and elements having a value of 0 are defined as "ineffective elements.' Expressed differently, an 'effective element' may also be referred to as a non-zero element, and an 'ineffective element' may also be referred to as a zero element. In the following, for the convenience of description, effective elements are illustrated with hatching, and ineffective elements are illustrated as blanks.

The processing unit 160 may receive a weight matrix Weight from the weight buffer 130, and calculate the weight matrix Weight and the first input activation Act_In_1. Assuming that the first input activation Act_In_1 is of a 1×8 matrix structure and the weight matrix Weight is of an 8×8 matrix structure, the processing unit 160 may perform a 2D matrix calculation on the 1×8 matrix and the 8×8 matrix and thereby generate a first output activation Act_Out_1. The first output activation Act_Out_1 may include a first output element out to an eighth output element ou8. For the convenience of description, only the process of calculating the first output element ou1 will be described. In this case, the values of column 1 of the weight matrix Weight are represented by weight element 1-1 w11 to weight element 8-1 w81, and it is assumed that weight element 1-1 w11 to weight element 8-1 w81 each have a non-zero value.

The processing unit 160 may calculate the first input activation Act_In_1 and column 1 of the weight matrix Weight and thus, compute the first output element out. This can be expressed in a mathematical equation as follows.

$$ou1 = i11 \cdot w11 + i12 \cdot w21 + i13 \cdot w31 + i14 \cdot w41 + i15 \cdot w51 + i16 \cdot w61 + i17 \cdot w71 + i18 \cdot w81 \quad \text{[Equation 1]}$$

As represented in Equation 1, the processing unit 160 may perform multiplication and addition calculations on input element 1-1 i11 to input element 1-8 i18, and weight element 1-1 w11 to weight element 8-1 w81 corresponding to each of these elements. In this case, input element 1-1 i11, input element 1-2 i12, input element 1-4 i14, input element 1-5 i15, and input element 1-6 i16 may each be effective elements, and multiplication and addition calculations on the effective elements may become effective calculations Eff_op for determining the first output element out. In other words, ($i11 \cdot w11 + i12 \cdot w21 + i14 \cdot w41 + i15 \cdot w51 + i16 \cdot w61$) may become an effective calculation Eff_op whose calculation result has a non-zero value. On the other hand, since input element 1-3 i13, input element 1-7 i17, and input element 1-8 i18 are ineffective elements, the multiplication and addition calculations with the weight elements corresponding thereto, i.e., ($i13 \cdot w31 + i17 \cdot w71 + i18 \cdot w81$) become an ineffective calculation Ineff_op whose calculation result has a value of 0. Although such an ineffective calculation Ineff_op has no effect on determining the first output element out, since the calculation is still performed, the resources of the processing unit 160 may be consumed unnecessarily due to the ineffective calculation Ineff_op.

According to some embodiments, the more the ineffective elements are in the input activation Act_In, the more the ineffective calculations Ineff_op increase, and thus, the more the resources of the processing unit 160 may be wasted. Hereinafter, the operation of the activation compressor 170 and the weight compressor 171 for reducing unnecessary consumption of resources and latency of the processing unit 160 will be described using FIGS. 16 to 34.

Figure 16:
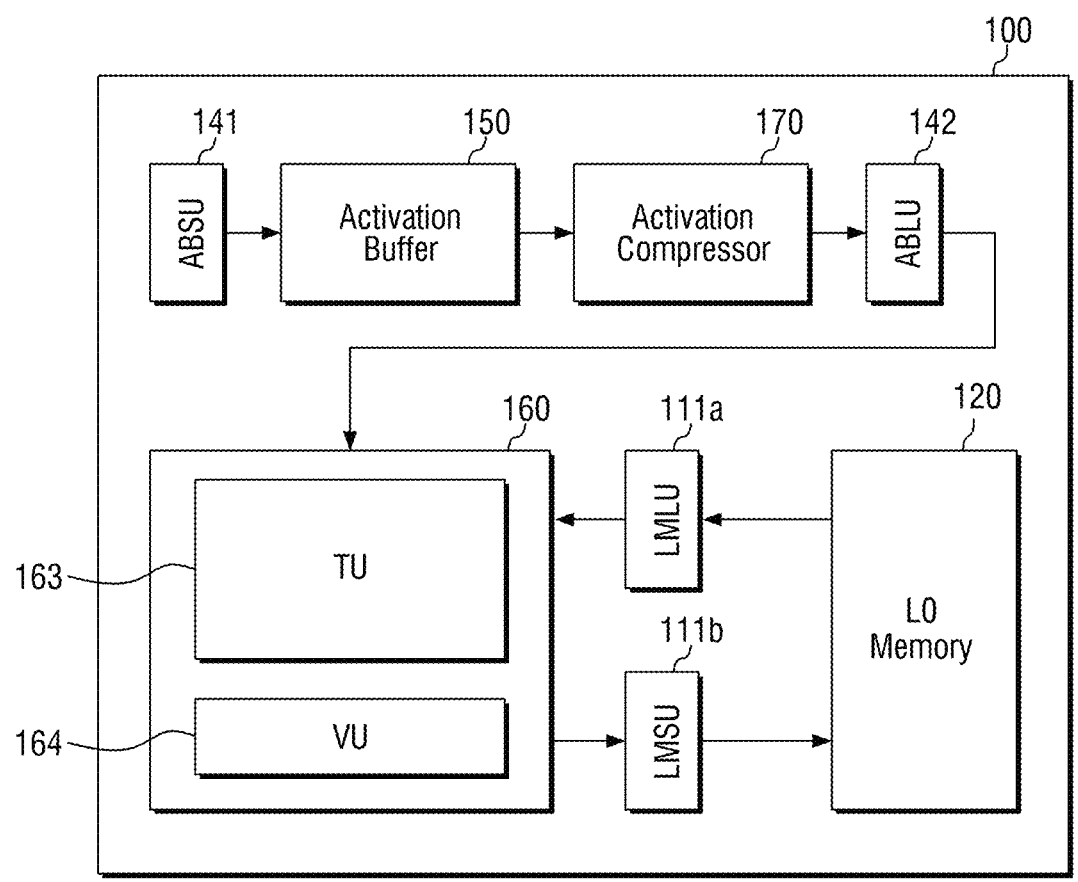
FIG. 16 is a diagram for illustrating in detail the structure of a neural core in accordance with some embodiments of the disclosure.

FIG. 16 is a diagram for illustrating in detail the structure of a neural core in accordance with some embodiments of the disclosure.

Referring to FIG. 16, the neural core 100 may include a L0 memory 120, an activation buffer 150, a processing unit 160, an activation compressor 170, an activation buffer store unit 141, an activation buffer load unit 142, a local memory load unit 111a, and a local memory store unit 111b. Further, the processing unit 160 may include a tensor unit 163 and a vector unit 164. Since the L0 memory 120, the activation buffer 150, the processing unit 160, the local memory load unit 111a, and the local memory store unit 111b have been described above, a specific description thereof will be omitted.

The activation buffer store unit 141 and the activation buffer load unit 142 may be of a configuration included in the activation LSU 140. The activation buffer store unit 141 may fetch a store instruction for the activation buffer 150 and issue the store instruction. In other words, the activation buffer store unit 141 may provide an input activation Act_In to the activation buffer 150, and control the activation buffer 150 to store the input activation Act_In. For example, the activation buffer store unit 141 may provide a first input activation Act_In_1 to the activation buffer 150 and control it to be stored.

Further, the activation buffer load unit 142 may fetch a load instruction for the activation buffer 150 and issue the load instruction. In other words, the activation buffer load unit 142 may be controlled to load the input activation Act_In stored in the activation buffer 150 and provide it to the activation compressor 170. In addition, the activation buffer load unit 142 may be controlled to provide the compressed input activation generated by the activation compressor 170 to the processing unit 160.

The activation compressor 170 may be provided with the input activation Act_In from the activation buffer 150. The activation compressor 170 may generate a compressed input activation by using the input activation Act_In. According to some embodiments, the activation compressor 170 may generate a compressed input activation by replacing the ineffective elements of the input activation Act_In with the effective elements of another input activation Act_In. In order to describe various embodiments of this, it will be described with reference to FIGS. 17 to 32.

Figure 17:
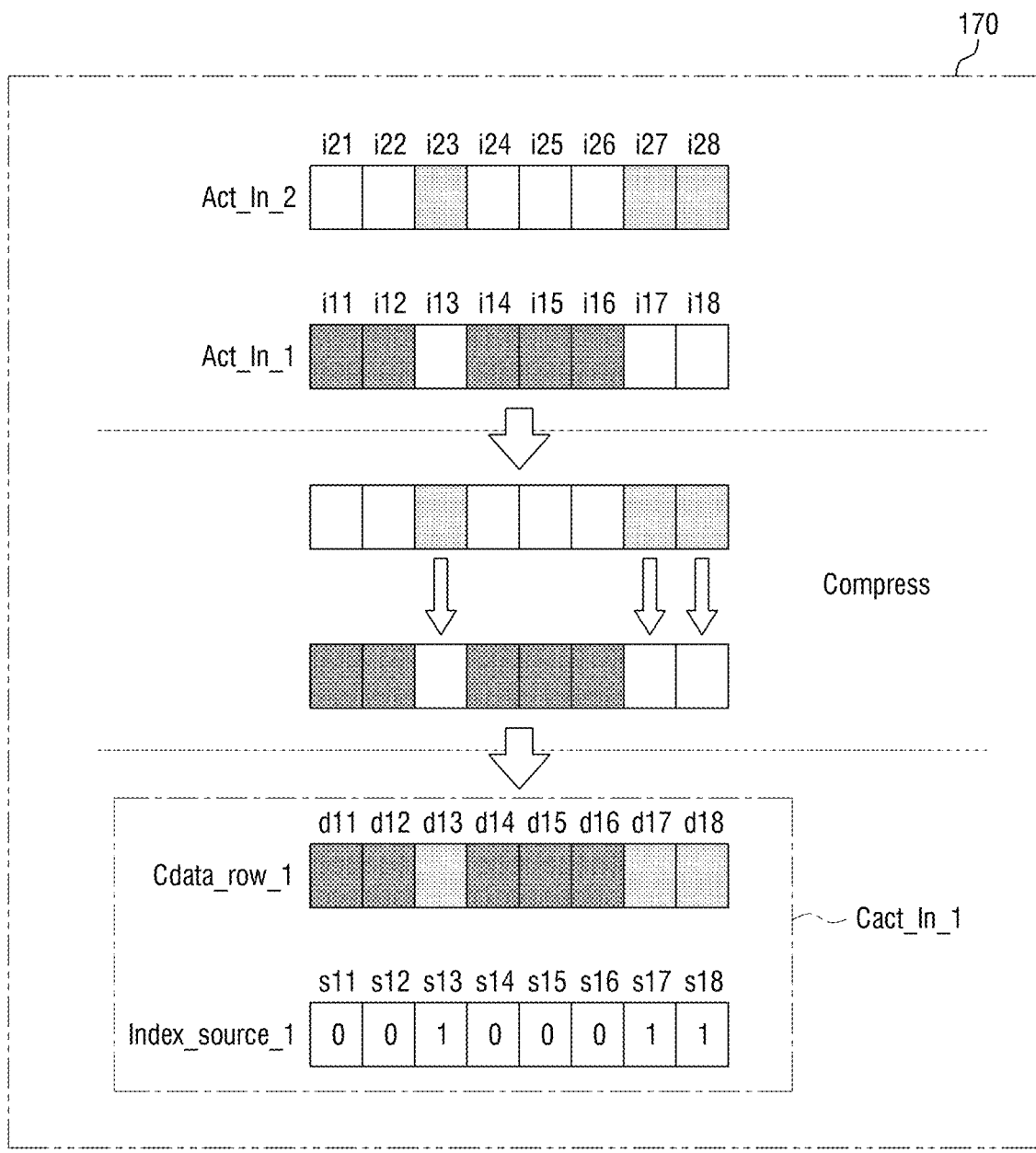
FIG. 17 is a diagram for illustrating the operation of an activation compressor in accordance with some embodiments of the disclosure.

FIG. 17 is a diagram for illustrating the operation of an activation compressor in accordance with some embodiments of the disclosure.

Referring to FIG. 17, the activation compressor 170 may be provided with a first input activation Act_In_1 and a second input activation Act_In_2. The first input activation Act_In_1 may include input element 1-1 i11, input element 1-2 i12, input element 1-4 i14, input element 1-5 i15, and input element 1-6 i16, which are effective elements, and input element 1-3 i13, input element 1-7 i17, and input element 1-8 i18, which are ineffective elements. In addition, the second input activation Act_In_2 may include input element 2-3 i23, input element 2-7 i27, and input element 2-8 i28, which are effective elements, and input element 2-1 i21, input element 2-2 i22, input element 2-4 i24, input element 2-5 i25, and input element 2-6 i26, which are ineffective elements.

The activation compressor 170 may generate a first compressed input activation Cact_In_1 by using the first input activation Act_In_1 and the second input activation Act_In_2.

The first compressed input activation Cact_In_1 may include first input row data Cdata_row_1 and a first source index Index_source_1.

The first input row data Cdata_row_1 may include at least a portion of the first input activation Act_In_1 and at least a portion of the second input activation Act_In_2. According to some embodiments, if the positions of the ineffective elements of the first input activation Act_In_1 and the positions of the effective elements of the second input activation Act_In_2 correspond to each other, the activation compressor 170 may generate the first input row data Cdata_row_1 by pushing the effective elements of the second input activation Act_In_2 corresponding to the positions of the ineffective elements of the first input activation Act_In_1 to the ineffective elements of the first input activation Act_In_1. In this case, pushing a first element to a second element means that the second element is filled with the value of the first element and the first element is filled with the value of 0.

For example, the activation compressor 170 may generate the first input row data Cdata_row_1 by pushing input element 2-3 i23, input element 2-7 i27, and input element 2-8 i28 to input element 1-3 i13, input element 1-7 i17, and input element 1-8 i18, respectively. In other words, data element 1-1 d11, data element 1-2 d12, data element 1-4 d14, data element 1-5 d15, and data element 1-6 d16 of the first input row data Cdata_row_1 may be equal to the values of input element 1-1 i11, input element 1-2 i12, input element 1-4 i14, input element 1-5 i15, and input element 1-6 i16 of the first input activation Act_In_1, respectively. In addition, data element 1-3 d13, data element 1-7 d17, and data element 1-8 d18 of the first input row data Cdata_row_1 may be equal to the values of input element 2-3 i23, input element 2-7 i27, and input element 2-8 i28 of the second input activation Act_In_2, respectively.

According to some embodiments, the positions of the ineffective elements of the first input activation Act_In_1 and the effective elements of the second input activation Act_In_2 may correspond to each other. In other words, the activation compressor 170 may generate the first input row data Cdata_row_1 by pushing the effective elements of the second input activation Act_In_2 to the ineffective elements of the first input activation Act_In_1 at the positions corresponding thereto.

For example, input element 1-3 i13, input element 1-7 i17, and input element 1-8 i18, which are ineffective elements, may be the third, seventh, and eighth elements of the first input activation Act_In_1, respectively, and input element 2-3 i23, input element 2-7 i27, and input element 2-8 i28, which are effective elements, may be the third, seventh, and eighth elements of the second input activation Act_In_2, respectively.

The first source index Index_source_1 may include information on the source of each element of the first input row data Cdata_row_1. That is, the first source index Index_source_1 may include an index indicating the values of which input activation Act_In the respective elements of the first input row data Cdata_row_1 are.

For example, the first source index Index_source_1 may include source element 1-1 s11 to source element 1-8 s18. Source element 1-1 s11 may correspond to data element 1-1 d11, source element 1-2 s12 may correspond to data element 1-2 d12, source element 1-3 s13 may correspond to data element 1-3 d13, source element 1-4 s14 may correspond to data element 1-4 d14, source element 1-5 s15 may correspond to data element 1-5 d15, source element 1-6 s16 may correspond to data element 1-6 d16, source element 1-7 s17 may correspond to data element 1-7 d17, and source element 1-8 s18 may correspond to data element 1-8 d18.

Figure 18:
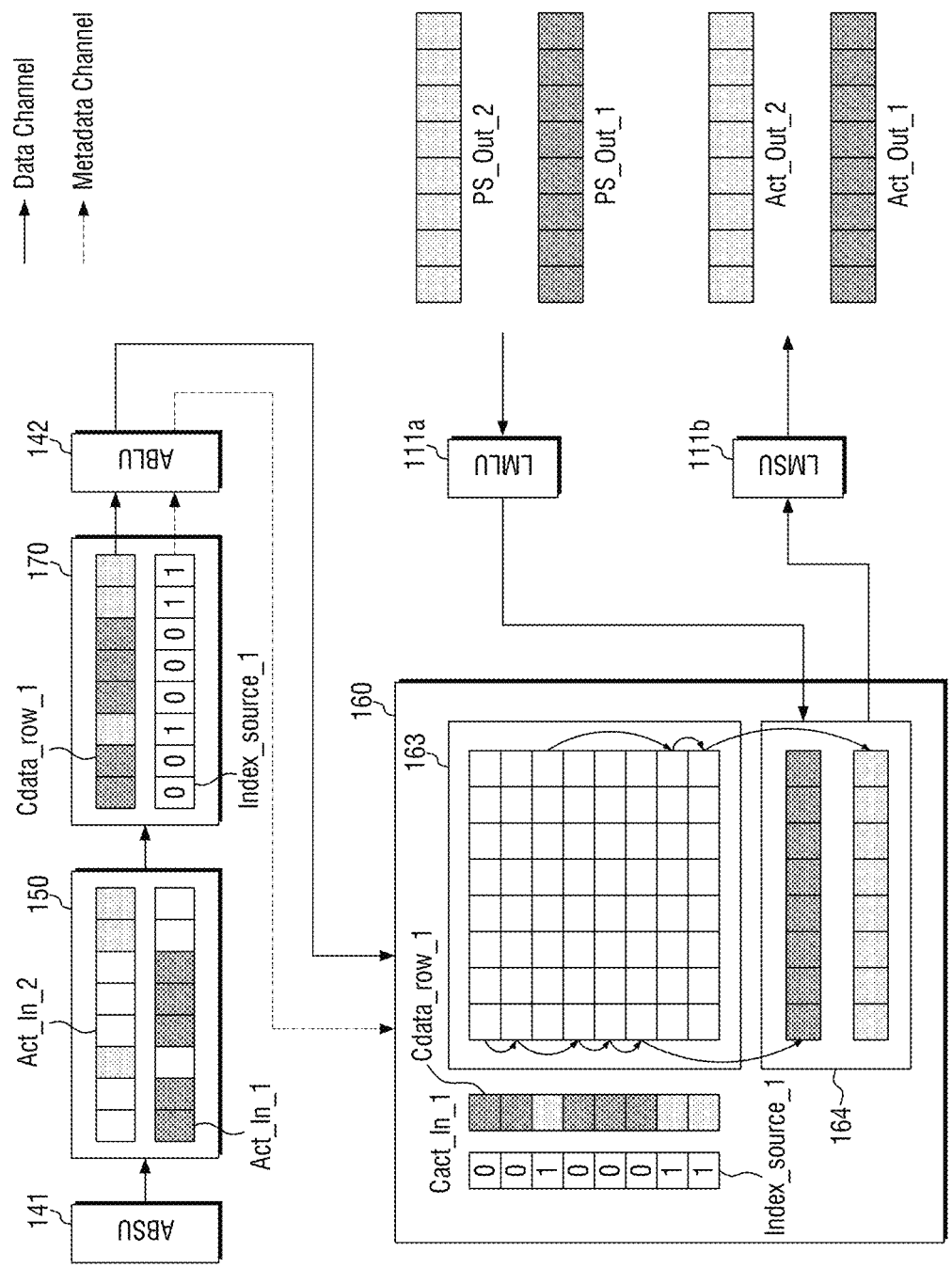
FIG. 18 is a diagram for illustrating the operation of a processing unit in accordance with some embodiments of the disclosure.

Source element 1-1 sit to source element 1-8 s18 may include information on the sources of data element 1-1 d11 to data element 1-8 d18, respectively. In other words, source element 1-1 sit may be indexed to 0, and indicate information that data element 1-1 d11 has originated from the first input activation Act_In_1. Likewise, source element 1-2 s12, source element 1-4 s14, source element 1-5 s15, and source element 1-6 s16 may each be indexed to 0, and indicate information that data element 1-2 d12, data element 1-4 d14, data element 1-5 d15, and data element 1-6 d16 have originated from the first input activation Act_In_1, respectively. On the other hand, source element 1-3 s13, source element 1-7 s17, and source element 1-8 s18 may each be indexed to 1, and indicate information that data element 1-3 d13, data element 1-7 d17, and data element 1-8 d18 have originated from the second input activation Act_In_2, respectively. In other words, the first source index Index_source_1 may be metadata of the first input row data Cdata_row_1. With further reference to FIG. 18, the operation of the processing unit 160 will be described.

FIG. 18 is a diagram for illustrating the operation of a processing unit in accordance with some embodiments of the disclosure.

Referring further to FIG. 18, the activation buffer store unit 141 may store the first input activation Act_In_1 and the second input activation Act_In_2 in the activation buffer 150. The activation buffer load unit 142 may provide the first input activation Act_In_1 and the second input activation Act_In_2 stored in the activation buffer 150 to the activation compressor 170. The activation compressor 170 may generate a first compressed input activation Cact_In_1 by using the first input activation Act_In_1 and the second input activation Act_In_2. As described above, the first compressed input activation Cact_In_1 may include a first input row data Cdata_row_1 and a first source index Index_source_1.

The activation buffer load unit 142 may provide the first compressed input activation Cact_In_1 generated by the activation compressor 170 to the processing unit 160.

The tensor unit 163 of the processing unit 160 may perform 2D (two-dimensional) calculations by using the first input row data Cdata_row_1 and the first source index Index_source_1. For example, the tensor unit 163 may perform a matrix calculation on the first input row data Cdata_row_1 and a weight matrix. When the tensor unit 163 performs a matrix calculation on the first input row data Cdata_row_1 and the weight matrix, the tensor unit 163 may refer to the first source index Index_source_1. In other words, the tensor unit 163 may separate the elements to perform a partial sum by referring to the first source index Index_source_1 and provide them to the vector unit 164.

For example, the tensor unit 163 may refer to the first source index Index_source_1, calculate data element 1-1 d11, data element 1-2 d12, data element 1-4 d14, data element 1-5 d15, and data element 1-6 d16 with the first, second, fourth, fifth, and sixth rows of the weight matrix, make a partial sum of the results, and provide it to a first register of the vector unit 164. The partial sum of the calculation result for data element 1-1 d11, data element 1-2 d12, data element 1-4 d14, data element 1-5 d15, and data element 1-6 d16 with the first, second, fourth, fifth, and sixth rows of the weight matrix is designated as a first partial sum for convenience. In addition, the tensor unit 163 may refer to the first source index Index_source_1, calculate data element 1-3 d13, data element 1-7 d17, and data element 1-8 d18 with the third, seventh, and eighth rows of the weight matrix, make a partial sum of the results, and provide it to a second register of the vector unit 164. The partial sum of the calculation result for data element 1-3 d13, data element 1-7 d17, and data element 1-8 d18 with the third, seventh, and eighth rows of the weight matrix is designated as a second partial sum for convenience.

The vector unit 164 may be provided with a first output partial sum PS_Out_1 and a second output partial sum PS_Out_2 via the local memory load unit 111a. The first output partial sum PS_Out_1 may be provided to the first register of the vector unit 164, and the second output partial sum PS_Out_2 may be provided to the second register of the vector unit 164. The first output partial sum PS_Out_1 and the second output partial sum PS_Out_2 may each be values that have been stored in the L0 memory 120. The first output partial sum PS_Out_1 and the second output partial sum PS_Out_2 may each be calculation results of a previous cycle or calculation results provided from another neural core 100. The vector unit 164 may calculate the first output partial sum PS_Out_1 and the first partial sum, and generate a first output activation Act_Out_1. Further, the vector unit 164 may calculate the second output partial sum PS_Out_2 and the second partial sum, and generate a second output activation Act_Out_2. The first output activation Act_Out_1 and the second output activation Act_Out_2 may be provided to the L0 memory 120 in sequence via the local memory store unit 111b. FIGS. 17 and 18 illustrate cases where the positions of the ineffective elements of the first input activation Act_In_1 correspond to the positions of the effective elements of the second input activation Act_In_2, respectively, and the number of ineffective elements of the first input activation Act_In_1 is greater than or equal to the number of effective elements of the second input activation Act_In_2. In the following, various embodiments that can be modified according to the form of the first input activation Act_In_1 and the second input activation Act_In_2 will be described.

Figure 19:
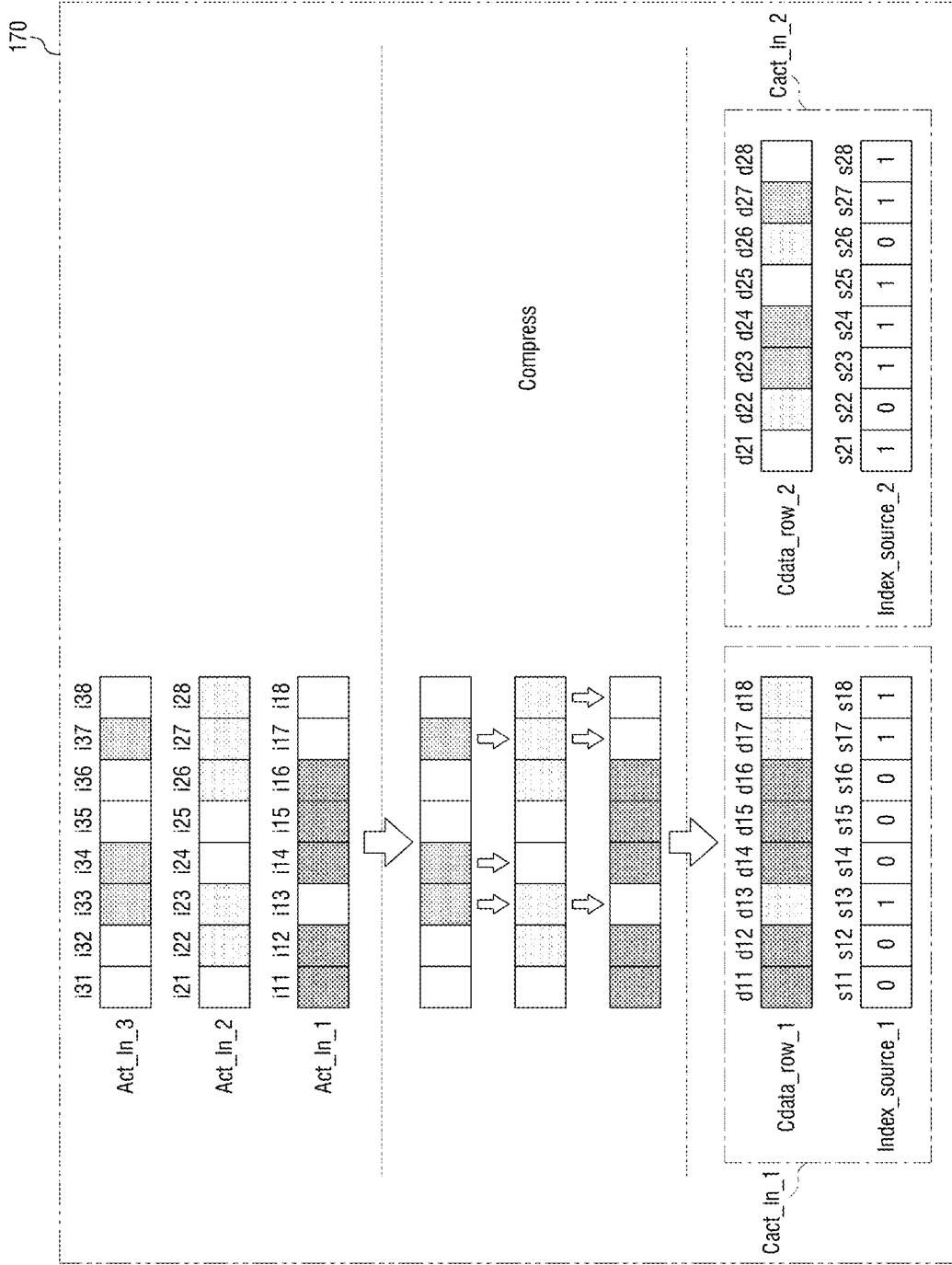
FIG. 19 is a diagram for illustrating the operation of an activation compressor in accordance with some embodiments of the disclosure.

FIG. 19 is a diagram for illustrating the operation of an activation compressor in accordance with some embodiments of the disclosure. In the following, the same or similar contents to what has been described above will be omitted or briefly described for the convenience of description.

Referring to FIG. 19, the activation compressor 170 may be provided with a first input activation Act_In_1 to a third input activation Act_In_3. The first input activation Act_In_1 may include input element 1-1 i11, input element 1-2 i12, input element 1-4 i14, input element 1-5 i15, and input element 1-6 i16, which are effective elements, and may include input element 1-3 i13, input element 1-7 i17, and input element 1-8 i18, which are ineffective elements. Further, the second input activation Act_In_2 may include input element 2-2 i22, input element 2-3 i23, input element 2-6 i26, input element 2-7 i27, and input element 2-8 i28, which are effective elements, and may include input element 2-1 i21, input element 2-4 i24, and input element 2-5 i25, which are ineffective elements. In addition, the third input activation Act_In_3 may include input element 3-3 i33, input element 3-4 i34, and input element 3-7 i37, which are effective elements, and may include input element 3-1 i31, input element 3-2 i32, input element 3-5 i35, input element 3-6 i36, and input element 3-8 i38, which are ineffective elements.

The activation compressor 170 may generate a first compressed input activation Cact_In_1 and a second compressed input activation Cact_In_2 by using the first input activation Act_In_1 to the third input activation Act_In_3. The first compressed input activation Cact_In_1 may include first input row data Cdata_row_1 and a first source index Index_source_1, and the second compressed input activation Cact_In_2 may include second input row data Cdata_row_2 and a second source index Index_source_2.

The first input row data Cdata_row_1 may include at least a portion of the first input activation Act_In_1 and at least a portion of the second input activation Act_In_2. Further, the second input row data Cdata_row_2 may include at least a portion of the second input activation Act_In_2 and at least a portion of the third input activation Act_In_3.

According to some embodiments, the activation compressor 170 may generate the first input row data Cdata_row_1 by pushing the effective elements of the second input activation Act_In_2 corresponding to the positions of the ineffective elements of the first input activation Act_In_1 to the ineffective elements of the first input activation Act_In_1. Next, the activation compressor 170 may generate the second input row data Cdata_row_2 by pushing the effective elements of the third input activation Act_In_3 corresponding to the positions of the ineffective elements to those ineffective elements of the pushed second input activation. In this case, the pushed input activation refers to an input activation in a state in which at least some of the input elements of the input activation are pushed to another input activation.

For example, the activation compressor 170 may generate the first input row data Cdata_row_1 by pushing input element 2-3 i23, input element 2-7 i27, and input element 2-8 i28 to input element 1-3 i13, input element 1-7 i17, and input element 1-8 i18, respectively. Further, the activation compressor 170 may generate the second input row data Cdata_row_2 by pushing input element 3-3 i33, input element 3-4 i34, and input element 3-7 i37 to input element 2-3 i23, input element 2-4 i24, and input element 2-7 i27, respectively.

The first source index Index_source_1 may include information on the source of each element of the first input row data Cdata_row_1, and the second source index Index_source_2 may include information on the source of each element of the second input row data Cdata_row_2.

For example, source element 1-1 s11, source element 1-2 s12, source element 1-4 s14, source element 1-5 s15, and source element 1-6 s16 may be indexed to 0, and may indicate information that data element 1-1 d11, data element 1-2 d12, data element 1-4 d14, data element 1-5 d15, and data element 1-6 d16 have originated from the first input activation Act_In_1. Further, source element 1-3 s13, source element 1-7 s17, and source element 1-8 s18 may each be indexed to 1, and may indicate information that data element 1-3 d13, data element 1-7 d17, and data element 1-8 d18 have originated from the second input activation Act_In_2, respectively. In addition, source element 2-2 s22 and source element 2-6 s26 may each be indexed to 0, and may indicate information that data element 2-2 d22 and data element 2-6 d26 have originated from the second input activation Act_In_2. Moreover, source element 2-3 s23, source element 2-4 s24, and source element 2-7 s27 may each be indexed to 1, and may indicate information that data element 2-3 d23, data element 2-4 d24, and data element 2-7 d27 have originated from the third input activation Act_In_3. In this case, source element 2-1 s21, source element 2-5 s25, and source element 2-8 s28 are indexed to 1, but embodiments are not limited thereto. Since data element 2-1 d21, data element 2-5 d25, and data element 2-8 d28 are ineffective elements (the calculation result is 0), indexing of source element 2-1 s21, source element 2-5 s25, and source element 2-8 s28 may not be important.

Figure 20:
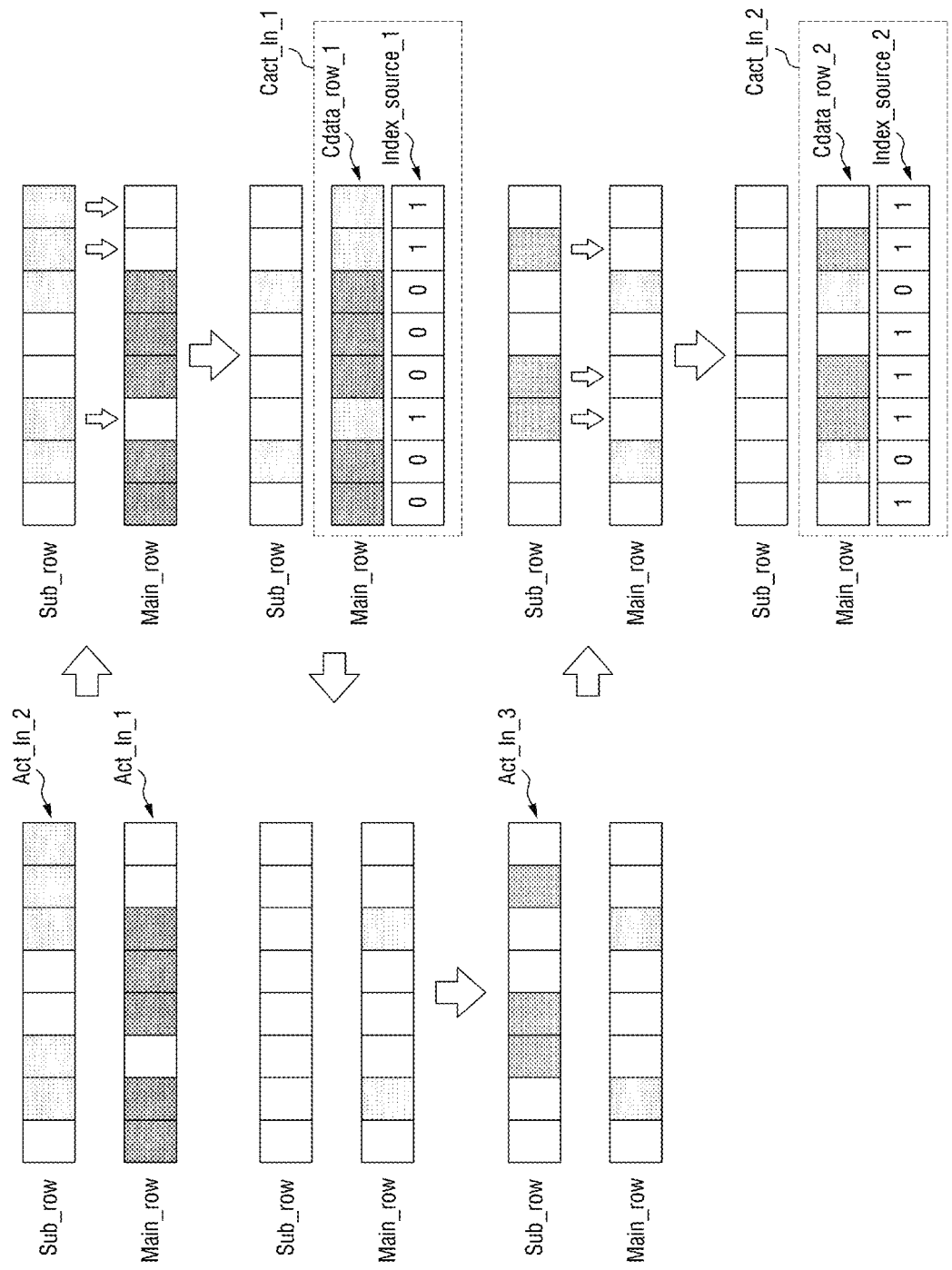
FIG. 20 is a diagram for illustrating a compression process of an activation compressor in accordance with some embodiments of the disclosure.

The first source index Index_source_1 and the second source index Index_source_2 may be metadata of the first input row data Cdata_row_1 and the second input row data Cdata_row_2, respectively. With further reference to FIG. 20, a compression process of an activation compressor 170 in accordance with some embodiments of the disclosure will be described in sequence.

FIG. 20 is a diagram for illustrating a compression process of an activation compressor in accordance with some embodiments of the disclosure.

Referring further to FIG. 20, the main row Main_row of the activation compressor 170 may be provided with a first input activation Act_In_1, and the sub-row Sub_row may be provided with a second input activation Act_In_2. The main row Main_row may be provided with an input activation that becomes the base of a compressed input activation, and the sub-row Sub_row may be provided with an input activation including input elements to be pushed to the main row Main_row. In other words, the activation compressor 170 may generate a first input row data Cdata_row_1 by pushing the effective elements of the sub-row Sub_row to the ineffective elements of the main row Main_row.

The activation compressor 170 may generate a first source index Index_source_1 including source information for each of the data elements of the first input row data Cdata_row_1. The activation compressor 170 may provide a first compressed input activation Cact_In_1 including the first input row data Cdata_row_1 and the first source index Index_source_1 to the processing unit 160.

When the first compressed input activation Cact_In_1 is provided to the processing unit 160, the activation compressor 170 may push the data elements of the sub-row Sub_row to the main row Main_row. Subsequently, the sub-row Sub_row may be provided with a third input activation Act_In_3. Similar to what was previously described, the activation compressor 170 may combine the data elements of the main row Main_row and the data elements of the sub-row Sub_row, and may thus generate a second input row data Cdata_row_2 and generate a second source index Index_source_2 that is metadata for the second input row data Cdata_row_2.

Figure 21:
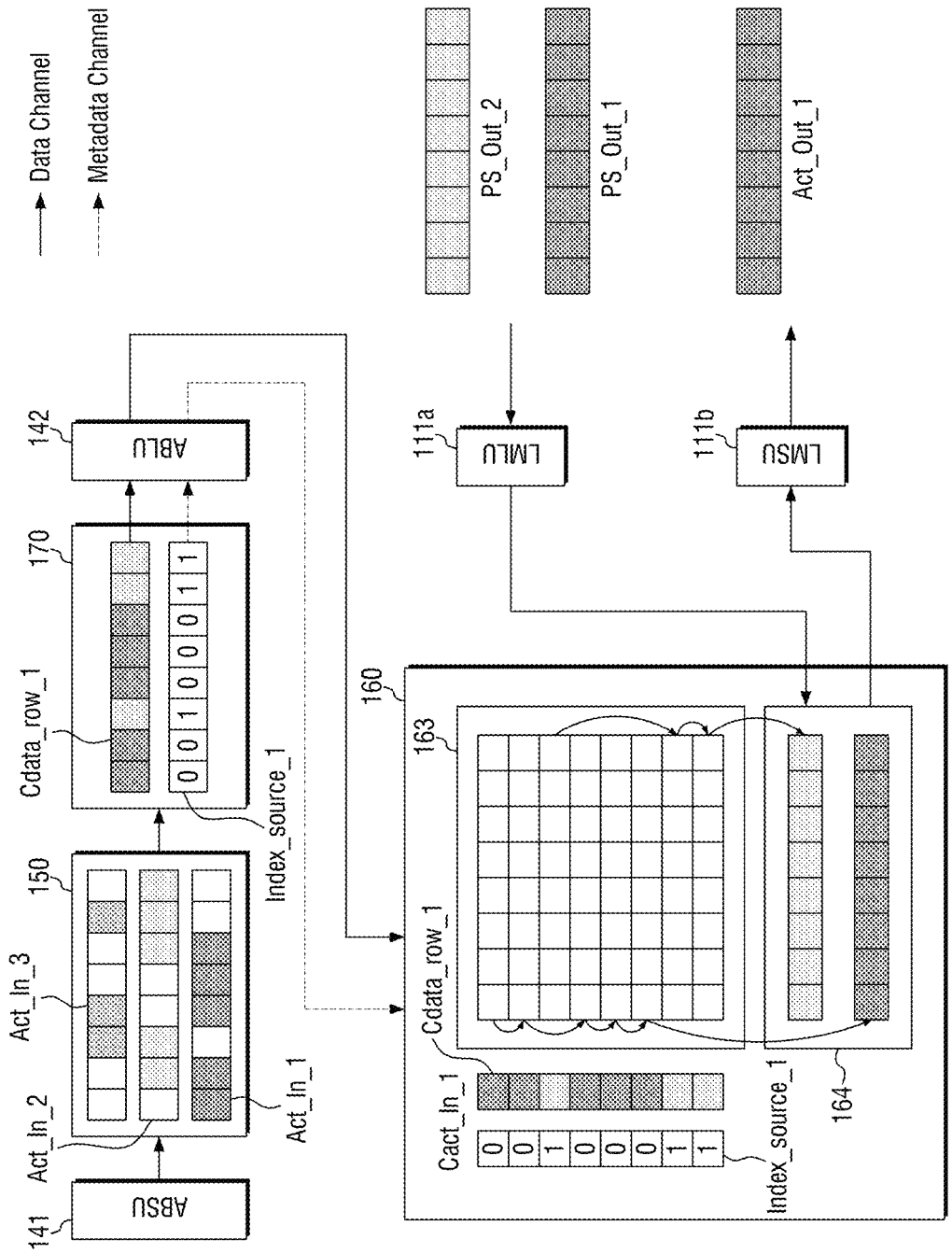
FIGS. 21 and 22 are diagrams for illustrating the operation of a processing unit in accordance with some embodiments of the disclosure.
Figure 22:
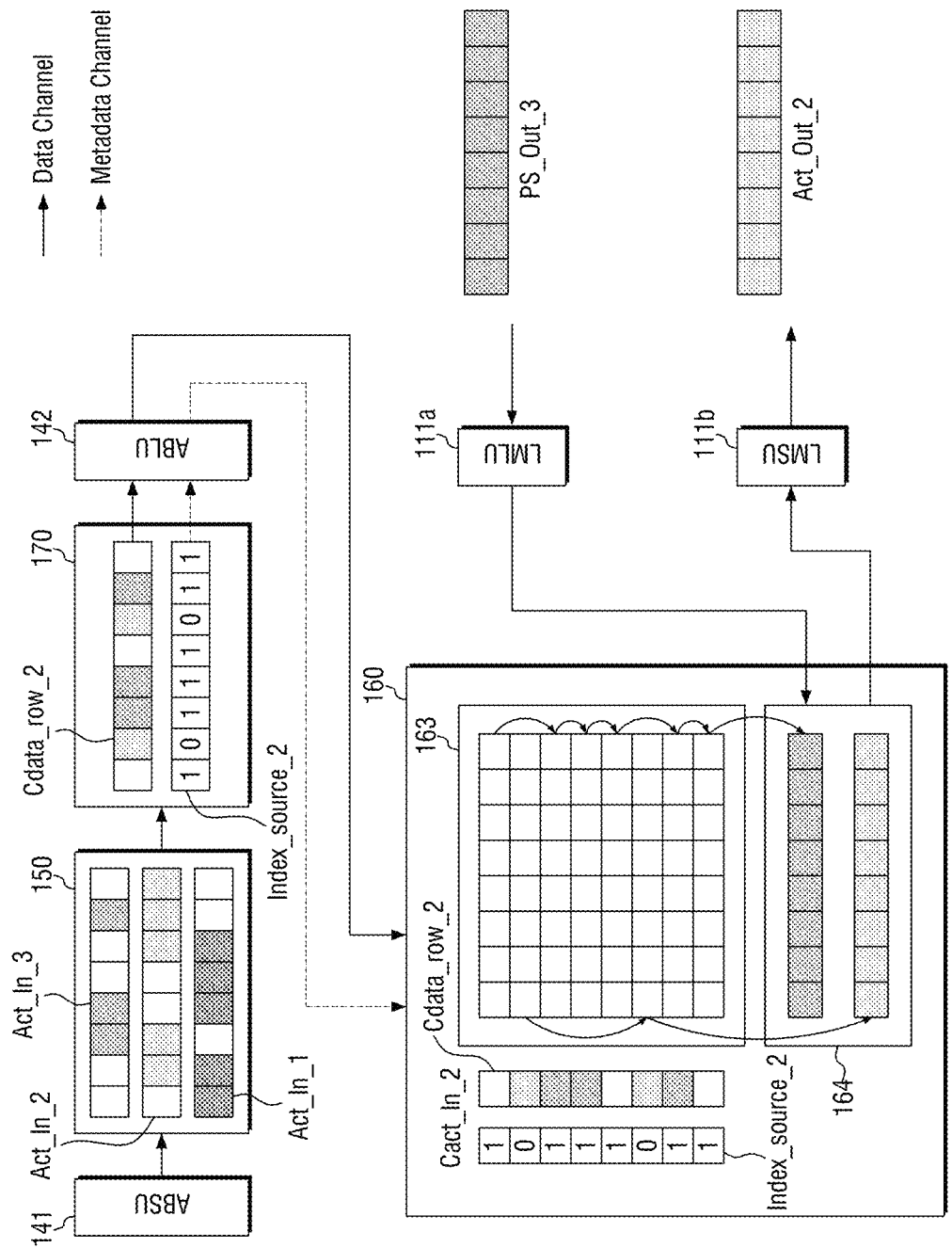

FIGS. 21 and 22 are diagrams for illustrating the operation of a processing unit in accordance with some embodiments of the disclosure.

Referring further to FIG. 21, the activation buffer store unit 141 may store a first input activation Act_In_1 to a third input activation Act_In_3 in the activation buffer 150. The activation buffer load unit 142 may provide the first input activation Act_In_1 to the third input activation Act_In_3 stored in the activation buffer 150 to the activation compressor 170.

The activation compressor 170 may first generate a first compressed input activation Cact_In_1 by using the first input activation Act_In_1 and the second input activation Act_In_2.

The tensor unit 163 of the processing unit 160 may perform a 2D calculation by using first input row data Cdata_row_1 and a first source index Index_source_1. For example, the tensor unit 163 may refer to the first source index Index_source_1, and thereby provide the calculation results for data element 1-1 d11, data element 1-2 d12, data element 1-4 d14, data element 1-5 d15, and data element 1-6 d16 to a first register of the vector unit 164. Further, the tensor unit 163 may refer to the first source index Index_source_1, and thereby provide the calculation results for data element 1-3 d13, data element 1-7 d17, and data element 1-8 d18 to a second register of the vector unit 164.

The vector unit 164 may be provided with a first output partial sum PS_Out_1 and a second output partial sum PS_Out_2 via the local memory load unit 111a. The first output partial sum PS_Out_1 may be provided to the first register of the vector unit 164, and the second output partial sum PS_Out_2 may be provided to the second register of the vector unit 164. The vector unit 164 may calculate the calculation result for the data elements provided to the first register and the first output partial sum PS_Out_1 and thereby generate a first output activation Act_Out_1. The local memory store unit 111b may provide the generated first output activation Act_Out_1 to the L0 memory 120. Subsequently, the vector unit 164 may calculate the calculation result for the data elements provided to the second register and the second output partial sum PS_Out_2, and provide (push) it to the first register. In this case, providing the calculation result to the first register is for convenience of description, and embodiments are not limited thereto. Those of ordinary skill in the art of the disclosure will be able to implement various modifications without departing from the scope of the disclosure.

Referring further to FIG. 22, the activation compressor 170 may generate a second compressed input activation Cact_In_2 by using the third input activation Act_In_3 and at least a portion of the second input activation Act_In_2.

The tensor unit 163 of the processing unit 160 may perform a 2D calculation by using second input row data Cdata_row_2 and a second source index Index_source_2. For example, the tensor unit 163 may refer to the second source index Index_source_2, and thereby provide the calculation results for data element 2-2 d22 and data element 2-6 d26 to the first register of the vector unit 164. Further, the tensor unit 163 may refer to the second source index Index_source_2, and thereby provide the calculation results for data element 2-1 d21, data element 2-3 d23, data element 2-4 d24, data element 2-5 d25, and data element 2-7 d27, and data element 2-8 d28 to the second register of the vector unit 164.

The vector unit 164 may be provided with a third output partial sum PS_Out_3 via the local memory load unit 111a. The third output partial sum PS_Out_3 may be provided to the second register of the vector unit 164. The vector unit 164 may calculate the calculation result that has been stored in the first register and the calculation result for data element 2-2 d22 and data element 2-6 d26, and thereby generate a second output activation Act_Out_2. The local memory store unit 111b may provide the generated second output activation Act_Out_2 to the L0 memory 120. Subsequently, the vector unit 164 may calculate the calculation result for the data elements provided to the second register and the third output partial sum PS_Out_3, and push it to the first register. The above processes may be repeated until the input activations Act_In have all been calculated.

Figure 23:
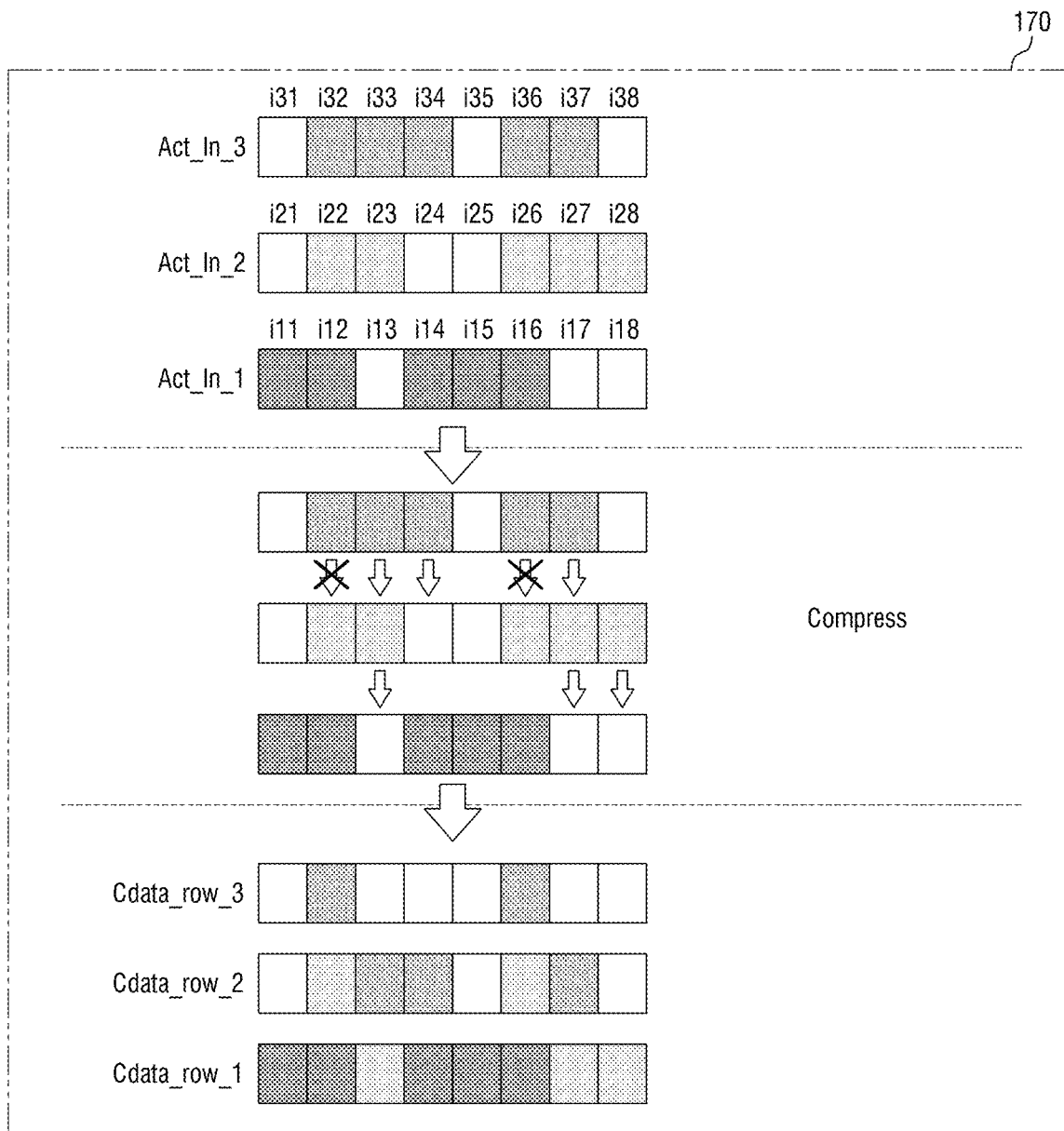
FIG. 23 is a diagram for illustrating an example in which a bottleneck occurs in an activation compressor in accordance with some embodiments of the disclosure.

FIG. 23 is a diagram for illustrating an example in which a bottleneck occurs in an activation compressor in accordance with some embodiments of the disclosure.

Referring further to FIG. 23, the activation compressor 170 may be provided with a first input activation Act_In_1 to a third input activation Act_In_3. The first input activation Act_In_1 may include input element 1-1 i11, input element 1-2 i12, input element 1-4 i14, input element 1-5 i15, and input element 1-6 i16, which are effective elements, and may include input element 1-3 i13, input element 1-7 i17, and input element 1-8 i18, which are ineffective elements. Further, the second input activation Act_In_2 may include input element 2-2 i22, input element 2-3 i23, input element 2-6 i26, input element 2-7 i27, and input element 2-8 i28, which are effective elements, and may include input element 2-1 i21, input element 2-4 i24, and input element 2-5 i25, which are ineffective elements. In addition, the third input activation Act_In_3 may include input element 3-2 i32, input element 3-3 i33, input element 3-4 i34, input element 3-6 i36, and input element 3-7 i37, which are effective elements, and may include input element 3-1 i31, input element 3-5 i35, and input element 3-8 i38, which are ineffective elements.

The activation compressor 170 may generate first input row data Cdata_row_1 to third input row data Cdata_row_3 by compressing the first input activation Act_In_1 to the third input activation Act_In_3 through the input activation compression operation process described above. For example, if the positions of the ineffective elements of the first input activation Act_In_1 and the effective elements of the second input activation Act_In_2 correspond to each other, the activation compressor 170 may generate the first input row data Cdata_row_1 by pushing the effective elements of the second input activation Act_In_2 to the ineffective elements of the first input activation Act_In_1.

On the other hand, if the elements at particular positions of the first input activation Act_In_1 to the third input activation Act_In_3 are all effective elements, a case may occur where the activation compressor 170 cannot push the elements at particular positions to elements of another input activation. In other words, a case may occur in which the number of compressed input activations generated through the compression operation by the activation compressor 170 is equal to the number of input activations provided to the activation compressor 170.

For example, input element 1-2 i12, input element 2-2 i22, input element 3-2 i32, input element 1-6 i16, input element 2-6 i26, and input element 3-6 i36 may all be effective elements. The activation compressor 170 can generate the first input row data Cdata_row_1 by using the first input activation Act_In_1 and the second input activation Act_In_2, but input element 2-2 i22 and input element 2-6 i26 cannot be pushed to input element 1-2 i12 and input element 1-6 i16, respectively. Therefore, input element 2-2 i22 and input element 2-6 i26 are included in the second input row data Cdata_row_2. Similarly, the activation compressor 170 cannot push input element 3-2 i32 and input element 3-6 i36 to input element 2-2 i22 and input element 2-6 i26, respectively. Therefore, input element 3-2 i32 and input element 3-6 i36 are included in the third input row data Cdata_row_3. In this way, even though the compression operation has been performed through the activation compressor 170, the result may be that the number of input activations provided to the activation compressor 170 and the number of compressed input activations outputted from the activation compressor 170 are equal to each other as three (3). This eventually means that an inefficiency occurs in which the activation compressor 170 could not compress the input activations Act_In, and some embodiments for solving such a problem will be described below.

Figure 24:
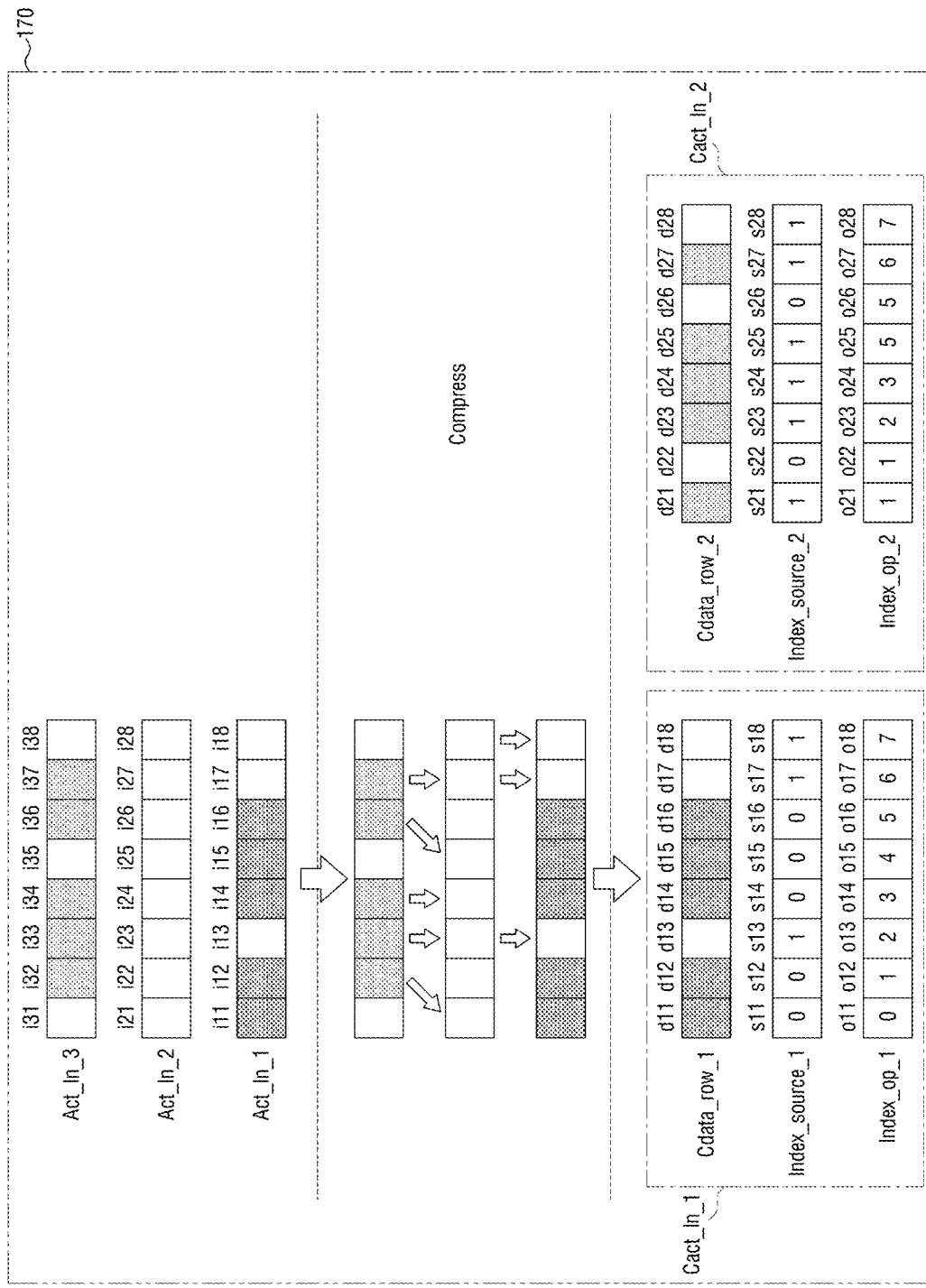
FIG. 24 is a diagram for illustrating the operation of an activation compressor in accordance with some embodiments of the disclosure.

FIG. 24 is a diagram for illustrating the operation of an activation compressor in accordance with some embodiments of the disclosure.

Referring further to FIG. 24, the activation compressor 170 may be provided with a first input activation Act_In_1 to a third input activation Act_In_3. It is assumed that the first input activation Act_In_1 to the third input activation Act_In_3 are the same as those described with reference to FIG. 23.

The activation compressor 170 may generate a first compressed input activation Cact_In_1 and a second compressed input activation Cact_In_2 by using the first input activation Act_In_1 to the third input activation Act_In_3.

The first compressed input activation Cact_In_1 may include first input row data Cdata_row_1, a first source index Index_source_1, and a first operation index Index_op_1. The first operation index Index_op_1 may include information on the calculation of the first input row data Cdata_row_1. In other words, the first operation index Index_op_1 may include information on the weight with which each of the data elements included in the first input row data Cdata_row_1 is to be calculated. That is, the first operation index Index_op_1 may include information on which weight each of the data elements included in the first input row data Cdata_row_1 should be calculated with.

The second compressed input activation Cact_In_2 may include second input row data Cdata_row_2, a second source index Index_source_2, and a second operation index Index_op_2. Similarly, the second operation index Index_op_2 may include information on the calculation of the second input row data Cdata_row_2. That is, the second operation index Index_op_2 may include information on the weight with which each of the data elements included in the second input row data Cdata_row_2 is to be calculated.

According to some embodiments, the first operation index Index_op_1 may include operation element 1-1 o11 to operation element 1-8 o18. Operation element 1-1 o11 to operation element 1-8 o18 may indicate the positions of the weights with which data element 1-1 d11 to data element 1-8 d18 are to be calculated, respectively. For example, if operation element 1-1 o11 is 0, the processing unit 160 may calculate data element 1-1 d11 with the weight in the first row of the weight matrix.

According to some embodiments, the activation compressor 170 may generate the first input row data Cdata_row_1 by pushing the effective elements of the second input activation Act_In_2 corresponding to the positions of the ineffective elements to those ineffective elements of the first input activation Act_In_1.

The activation compressor 170 may push the effective elements of the third input activation Act_In_3 corresponding to the positions of the ineffective elements to those ineffective elements of the pushed second input activation. If there still exist in the third input activation Act_In_3 the effective elements that have not been pushed, the activation compressor 170 may determine whether there exist ineffective elements in the pushed second input activation, and then, push the effective elements of the third input activation Act_In_3 to those ineffective elements.

For example, the activation compressor 170 may generate the first input row data Cdata_row_1 by pushing input element 2-3 i23, input element 2-7 i27, and input element 2-8 i28 to input element 1-3 i13, input element 1-7 i17, and input element 1-8 i18, respectively. Further, the activation compressor 170 may push input element 3-3 i33, input element 3-4 i34, and input element 3-7 i37 to input element 2-3 i23, input element 2-4 i24, and input element 2-7 i27, respectively, may push input element 3-2 i32 to input element 2-1 i21, and may push input element 3-6 i36 to input element 2-5 i25, thereby generating the second input row data Cdata_row_2.

The activation compressor 170 may generate the first source index Index_source_1, the second source index Index_source_2, the first operation index Index_op_1, and the second operation index Index_op_2 when generating the first input row data Cdata_row_1 and the second input row data Cdata_row_2. Since the processing unit 160 calculates the first input row data Cdata_row_1 and the second input row data Cdata_row_2 by referring to the first operation index Index_op_1 and the second operation index Index_op_2, there may be no difference in the calculation results even if the positions of the effective elements to be pushed change.

Figure 25:
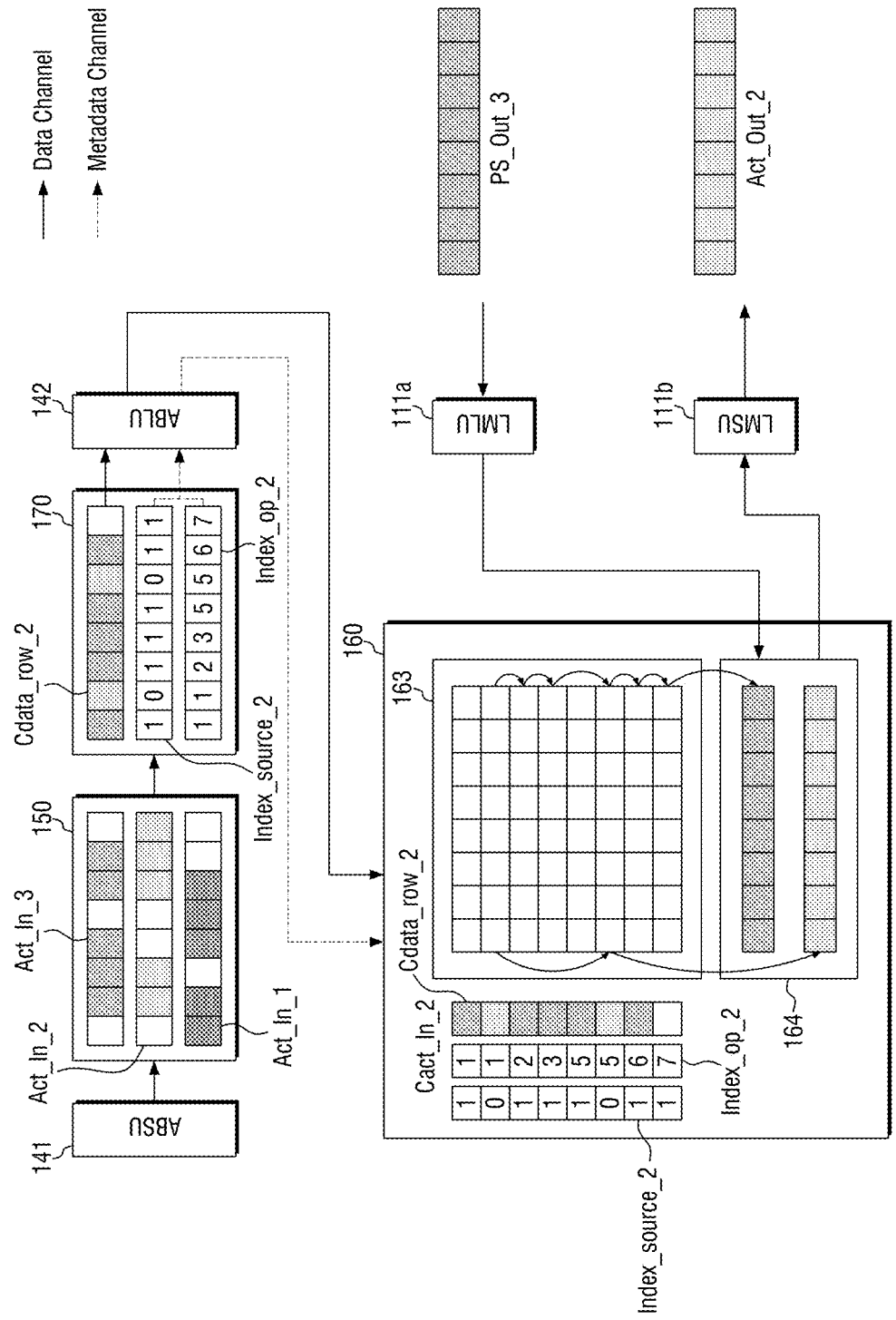
FIG. 25 is a diagram for illustrating the operation of a processing unit in accordance with some embodiments of the disclosure.

The first source index Index_source_1 and the first operation index Index_op_1 may be metadata of the first input row data Cdata_row_1. Likewise, the second source index Index_source_2 and the second operation index Index_op_2 may be metadata of the second input row data Cdata_row_2. With further reference to FIG. 25, the operation of the processing unit 160 in accordance with some embodiments of the disclosure will be described.

FIG. 25 is a diagram for illustrating the operation of a processing unit in accordance with some embodiments of the disclosure. For the convenience of description, the process of calculating the first compressed input activation will be omitted.

Referring further to FIG. 25, the activation compressor 170 may generate a second compressed input activation Cact_In_2 by using a third input activation Act_In_3 and at least a portion of a second input activation Act_In_2.

The tensor unit 163 of the processing unit 160 may perform a 2D calculation by using second input row data Cdata_row_2, a second source index Index_source_2, and a second operation index Index_op_2. For example, the tensor unit 163 may refer to the second source index Index_source_2 and the second operation index Index_op_2, calculate data element 2-2 d22 with the weight in the second row of the weight matrix, calculate data element 2-6 d26 with the weight in the sixth row of the weight matrix, make a partial sum of the calculation results, and provide it to the first register of the vector unit 164.

Further, the tensor unit 163 may refer to the second source index Index_source_2 and the second operation index Index_op_2, calculate data element 2-1 d21 with the weight in the second row of the weight matrix, calculate data element 2-3 d23 with the weight in the third row of the weight matrix, calculate data element 2-4 d24 with the weight in the fourth row of the weight matrix, calculate data element 2-5 d25 with the weight in the sixth row of the weight matrix, calculate data element 2-7 d27 with the weight in the seventh row of the weight matrix, calculate data element 2-8 d28 with the weight in the eighth row of the weight matrix, make a partial sum of the calculation results, and provide it to the second register of the vector unit 164.

The vector unit 164 may calculate the calculation result that has been stored in the first register and the calculation result for data element 2-2 d22 and data element 2-6 d26, and thereby generate a second output activation Act_Out_2. The local memory store unit 111b may provide the generated second output activation Act_Out_2 to the L0 memory 120. Subsequently, the vector unit 164 may calculate the calculation result for the data elements provided to the second register and the third output partial sum PS_Out_3, and push it to the first register. The above processes may be repeated until the input activations Act_In have all been calculated.

Figure 26:
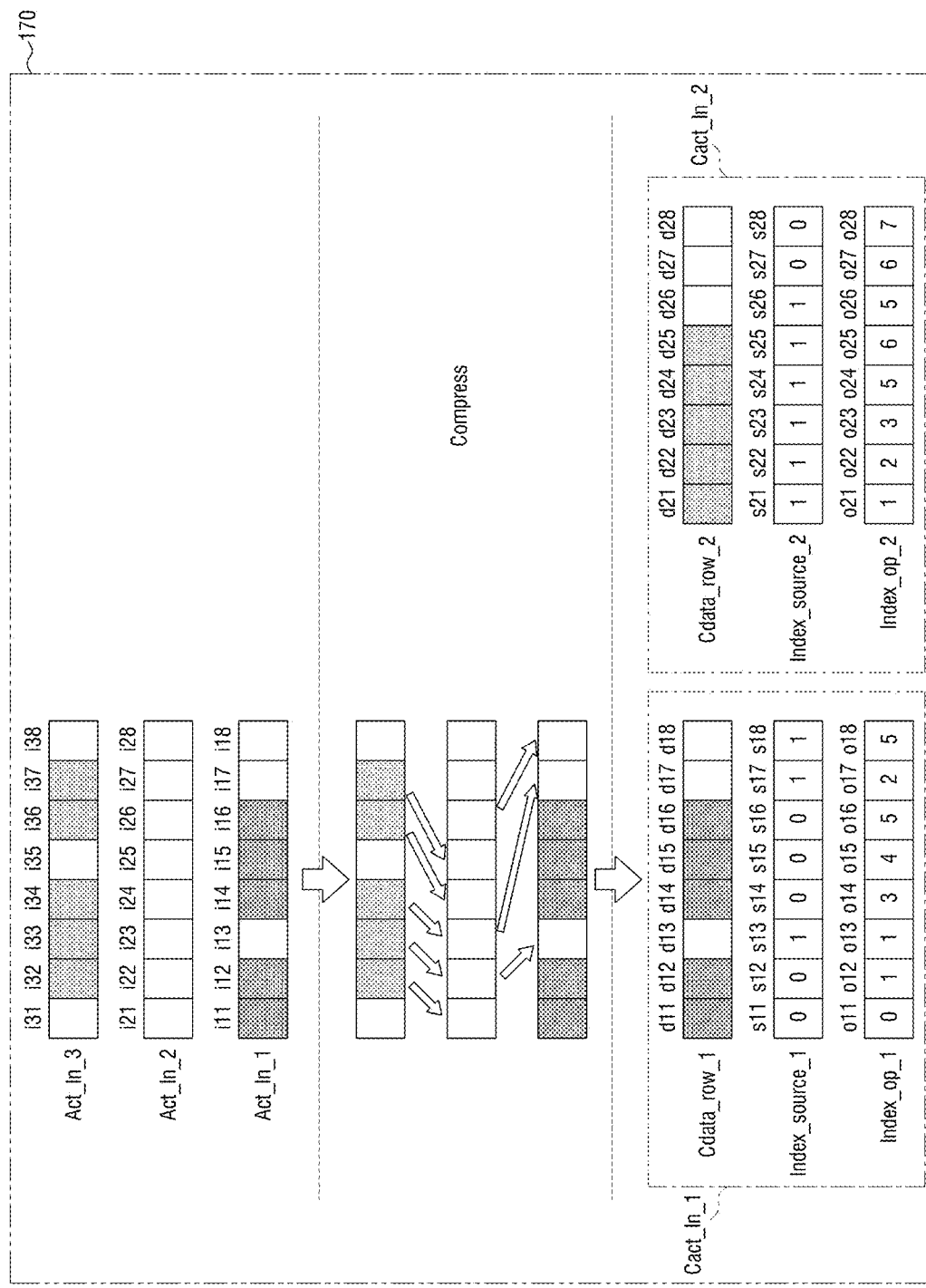
FIG. 26 is a diagram for illustrating the operation of an activation compressor in accordance with some embodiments of the disclosure.

FIG. 26 is a diagram for illustrating the operation of an activation compressor in accordance with some embodiments of the disclosure.

Referring to FIG. 26, the activation compressor 170 may be provided with a first input activation Act_In_1 to a third input activation Act_In_3. It is assumed that the first input activation Act_In_1 to the third input activation Act_In_3 are the same as those described with reference to FIG. 23.

The activation compressor 170 may generate a first compressed input activation Cact_In_1 and a second compressed input activation Cact_In_2 by using the first input activation Act_In_1 to the third input activation Act_In_3. The first compressed input activation Cact_In_1 may include first input row data Cdata_row_1, a first source index Index_source_1, and a first operation index Index_op_1, the second compressed input activation Cact_In_2 may include second input row data Cdata_row_2, a second source index Index_source_2, and a second operation index Index_op_2.

According to some embodiments, the activation compressor 170 may generate the first input row data Cdata_row_1 by sequentially pushing the effective elements of the second input activation Act_In_2 to the ineffective elements of the first input activation Act_In_1.

Similarly, the activation compressor 170 may generate the second input row data Cdata_row_2 by sequentially pushing the effective elements of the third input activation Act_In_3 to the ineffective elements of the pushed second input activation.

For example, the activation compressor 170 may generate the first input row data Cdata_row_1 by sequentially pushing input element 2-2 i22, input element 2-3 i23, and input element 2-6 i26 to input element 1-3 i13, input element 1-7 i17, and input element 1-8 i18, respectively. Further, the activation compressor 170 may generate the second input row data Cdata_row_2 by sequentially pushing input element 3-2 i32, input element 3-3 i33, input element 3-4 i34, input element 3-6 i36, and input element 3-7 i37 to input element 2-1 i21 to input element 2-5 i25, respectively.

The activation compressor 170 may generate the first source index Index_source_1, the second source index Index_source_2, the first operation index Index_op_1, and the second operation index Index_op_2 when generating the first input row data Cdata_row_1 and the second input row data Cdata_row_2.

Figure 27:
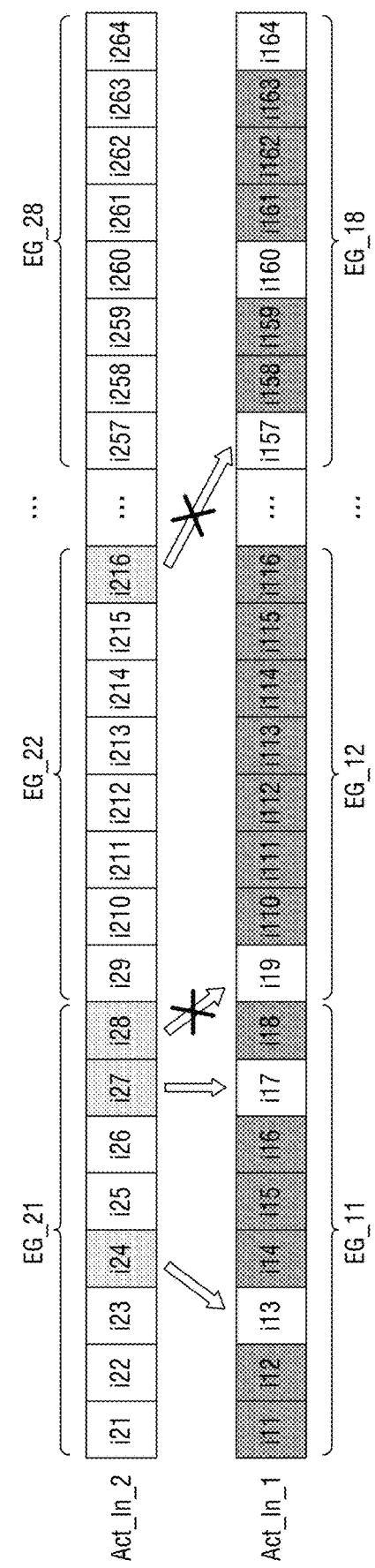
FIG. 27 is a diagram for illustrating an embodiment of pushing input elements only within an element group corresponding to some embodiments of the disclosure.

FIG. 27 is a diagram for illustrating an embodiment of pushing input elements only within an element group corresponding to some embodiments of the disclosure.

Referring to FIG. 27, a case is assumed and described where the first input activation Act_In_1 and the second input activation Act_In_2 each include 64 elements. The first input activation Act_In_1 may include a plurality of element groups. For example, the first input activation Act_In_1 may include element group 1-1 EG_11 to element group 1-8 EG_18. Each of the element groups may include a plurality of input elements. For example, element group 1-1 EG_11 may include input element 1-1 i11 to input element 1-8 i18, element group 1-2 EG_12 may include input element 1-9 i19 to input element 1-16 i116, and element group 1-8 EG_18 may include input element 1-57 i157 to input element 1-64 i164. That is, each element group may include eight (8) input elements, respectively. According to some embodiments, the size of each element group may correspond to the size of data inputted to the tensor unit 163. In other words, the first input activation Act_In_1 may group the input elements according to the size of data inputted to the tensor unit 163 and thus form element groups.

Likewise, the second input activation Act_In_2 may include a plurality of element groups. For example, the second input activation Act_In_2 may include element group 2-1 EG_21 to element group 2-8 EG_28. Element group 2-1 EG_21 may include input element 2-1 i21 to input element 2-8 i28, element group 2-2 EG_22 may include input element 2-9 i29 to input element 2-16 i216, and element group 2-8 EG_28 may include input element 2-57 i257 to input element 2-64 i264. In this case, element group 1-1 EG_11 may correspond to element group 2-1 EG_21, and element group 1-2 EG_12 may correspond to element group 2-2 EG_22. Likewise, element group 1-8 EG_18 and element group 2-8 EG_28 may correspond to each other.

According to some embodiments, when compressing the first input activation Act_In_1 and the second input activation Act_In_2, the input elements of the second input activation Act_In_2 may be pushed only to the element group corresponding to the element group of those input elements. For example, input element 2-1 i21 to input element 2-8 i28 included in element group 2-1 EG_21 may be pushed only to input element 1-1 i11 to input element 1-8 i18 included in element group 1-1 EG_11.

For example, input element 2-4 i24 belonging to element group 2-1 EG_21 may be pushed to input element 1-3 i13 belonging to element group 1-1 EG_11 corresponding to element group 2-1 EG_21. Likewise, input element 2-7 i27 may be pushed to input element 1-7 i17.

However, since element group 2-1 EG_21 and element group 1-2 EG_12 do not correspond to each other, input element 2-8 i28 included in element group 2-1 EG_21 cannot be pushed to input element 1-9 i19 included in element group 1-2 EG_12. Likewise, since element group 2-2 EG_22 and element group 1-8 EG_18 do not correspond to each other, input element 2-16 i216 included in element group 2-2 EG_22 cannot be pushed to input element 1-57 i157 included in element group 1-8 EG_18. However, this description is merely one embodiment, and the disclosure is not limited thereto.

Figure 28:
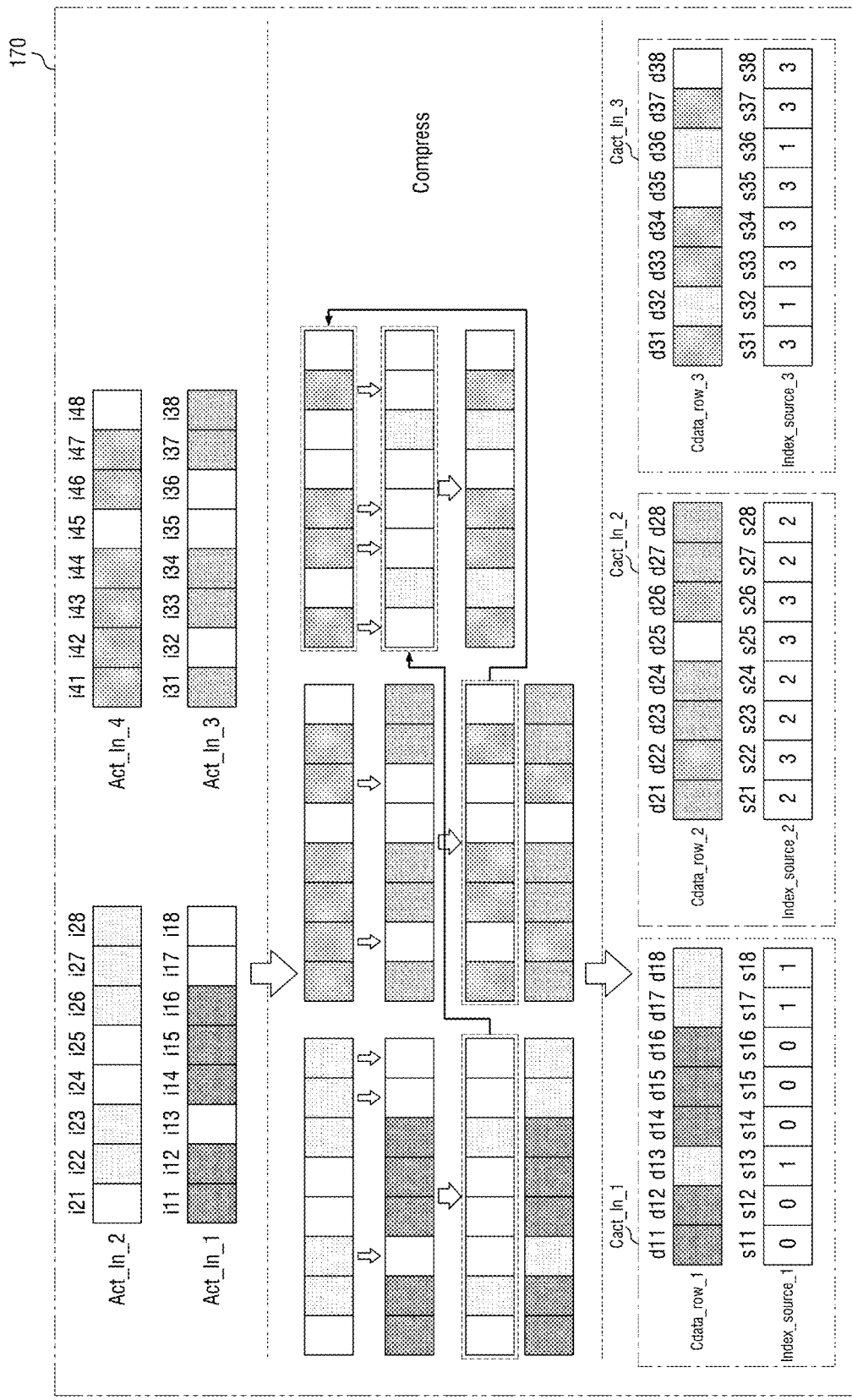
FIG. 28 is a diagram for illustrating the operation of an activation compressor in accordance with some embodiments of the disclosure.

FIG. 28 is a diagram for illustrating the operation of an activation compressor in accordance with some embodiments of the disclosure.

Referring further to FIG. 28, the activation compressor 170 may be provided with a first input activation Act_In_1, a second input activation Act_In_2, a third input activation Act_In_3, and a fourth input activation Act_In_4.

The activation compressor 170 may generate a first compressed input activation Cact_In_1 by using the first input activation Act_In_1 and the second input activation Act_In_2. Further, the activation compressor 170 may generate a second compressed input activation Cact_In_2 by using the third input activation Act_In_3 and the fourth input activation Act_In_4. In addition, the activation compressor 170 may generate a third compressed input activation Cact_In_3 by using the pushed second input activation and the pushed fourth input activation.

According to some embodiments, each of the pushed second input activation and the pushed fourth input activation may be in a state in which at least some input elements have been used to generate the first compressed input activation Cact_In_1 and the second compressed input activation Cact_In_2. Therefore, the pushed second input activation and the pushed fourth input activation may have effective elements distributed relatively sparsely. Therefore, it may be relatively easy to generate the third compressed input activation Cact_In_3 by compressing the pushed second input activation and the pushed fourth input activation. In other words, if pushed input activations are separately selected and compressed input activations are generated using only pushed input activations, separate operation indices may not be required. The operation of a neural processing device in accordance with some embodiments will be described in sequence by using FIGS. 29 to 31.

Figure 29:
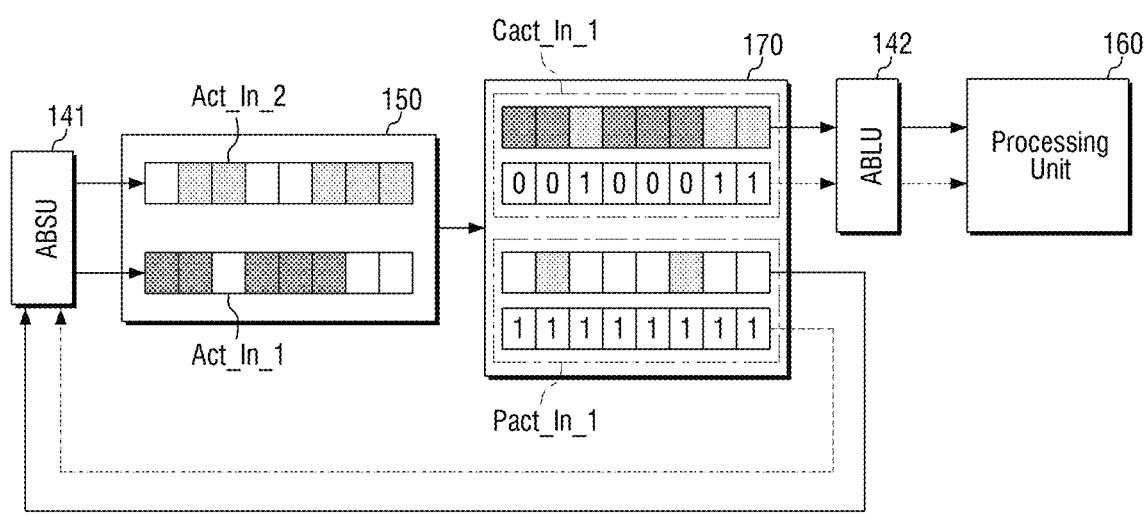
FIGS. 29 to 31 are diagrams for sequentially illustrating the operation of a neural processing device in accordance with some embodiments of the disclosure.
Figure 30:
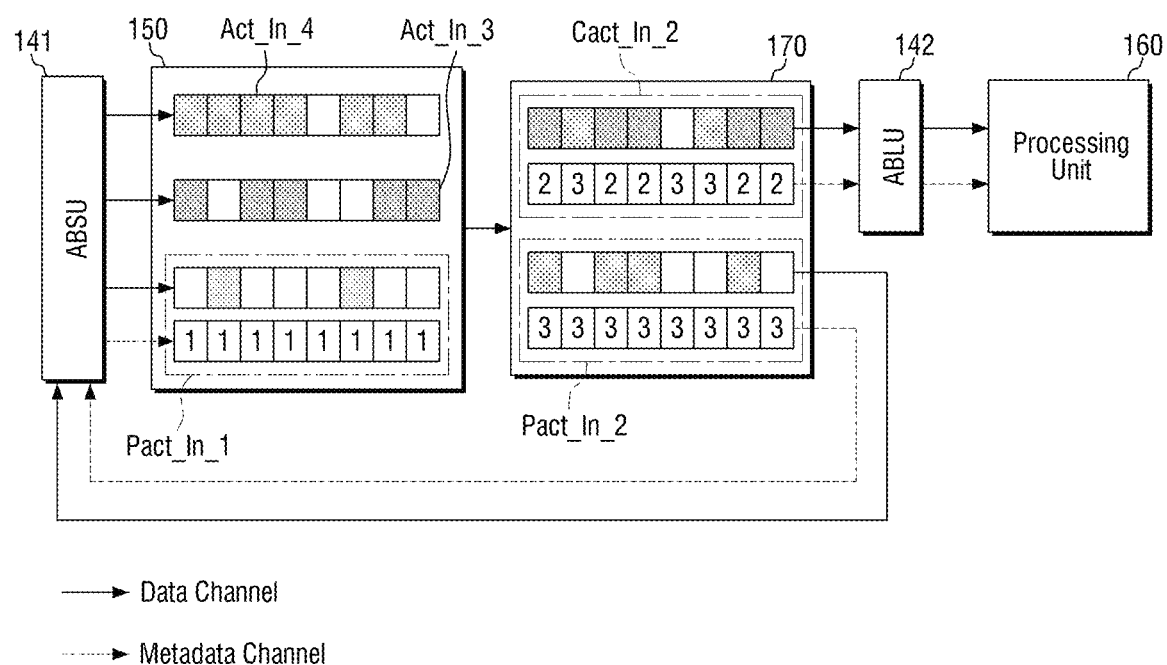
Figure 31:
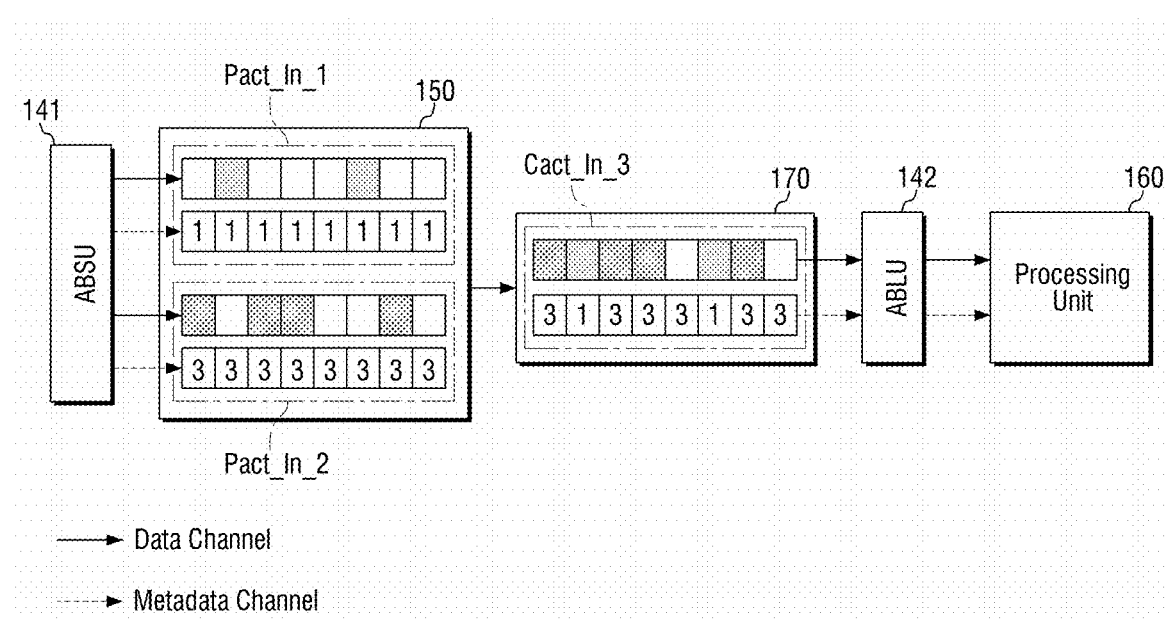

FIGS. 29 to 31 are diagrams for sequentially illustrating the operation of a neural processing device in accordance with some embodiments of the disclosure.

Referring further to FIG. 29, the activation buffer store unit 141 may store a first input activation Act_In_1 and a second input activation Act_In_2 in the activation buffer 150. The activation buffer load unit 142 may load the first input activation Act_In_1 and the second input activation Act_In_2 stored in the activation buffer 150, and provide them to the activation compressor 170. The activation compressor 170 may generate a first compressed input activation Cact_In_1 and a first preliminary input activation Pact_In_1 by using the first input activation Act_In_1 and the second input activation Act_In_2. The first preliminary input activation Pact_In_1 may be a pushed second input activation.

The activation buffer load unit 142 may load the first compressed input activation Cact_In_1 generated by the activation compressor 170 and provide it to the processing unit 160. The processing unit 160 may perform calculations by using the first compressed input activation Cact_In_1.

On the other hand, the activation buffer store unit 141 may provide the first preliminary input activation Pact_In_1 generated by the activation compressor 170 to the activation buffer 150. The first preliminary input activation Pact_In_1 may be temporarily stored in the activation buffer 150.

Next, with further reference to FIG. 30, the activation buffer store unit 141 may store the third input activation Act_In_3 and the fourth input activation Act_In_4 in the activation buffer 150. The activation buffer load unit 142 may generate a second compressed input activation Cact_In_2 and a second preliminary input activation Pact_In_2 by using the third input activation Act_In_3 and the fourth input activation Act_In_4 stored in the activation buffer 150. The second preliminary input activation Pact_In_2 may be a pushed fourth input activation.

The activation buffer load unit 142 may load the second compressed input activation Cact_In_2 generated by the activation compressor 170 and provide it to the processing unit 160. The processing unit 160 may perform calculations by using the second compressed input activation Cact_In_2.

On the other hand, the activation buffer store unit 141 may provide the second preliminary input activation Pact_In_2 generated by the activation compressor 170 to the activation buffer 150. The second preliminary input activation Pact_In_2 may be temporarily stored in the activation buffer 150.

Next, referring to FIG. 31, the activation buffer load unit 142 may load the first preliminary input activation Pact_In_1 and the second preliminary input activation Pact_In_2 stored in the activation buffer 150, and provide them to the activation compressor 170.

The activation compressor 170 may generate a third compressed input activation Cact_In_3 by using the first preliminary input activation Pact_In_1 and the second preliminary input activation Pact_In_2.

The activation buffer load unit 142 may provide the third compressed input activation Cact_In_3 generated by the activation compressor 170 to the processing unit 160. The processing unit 160 may perform calculations by using the third compressed input activation Cact_In_3.

Figure 32:
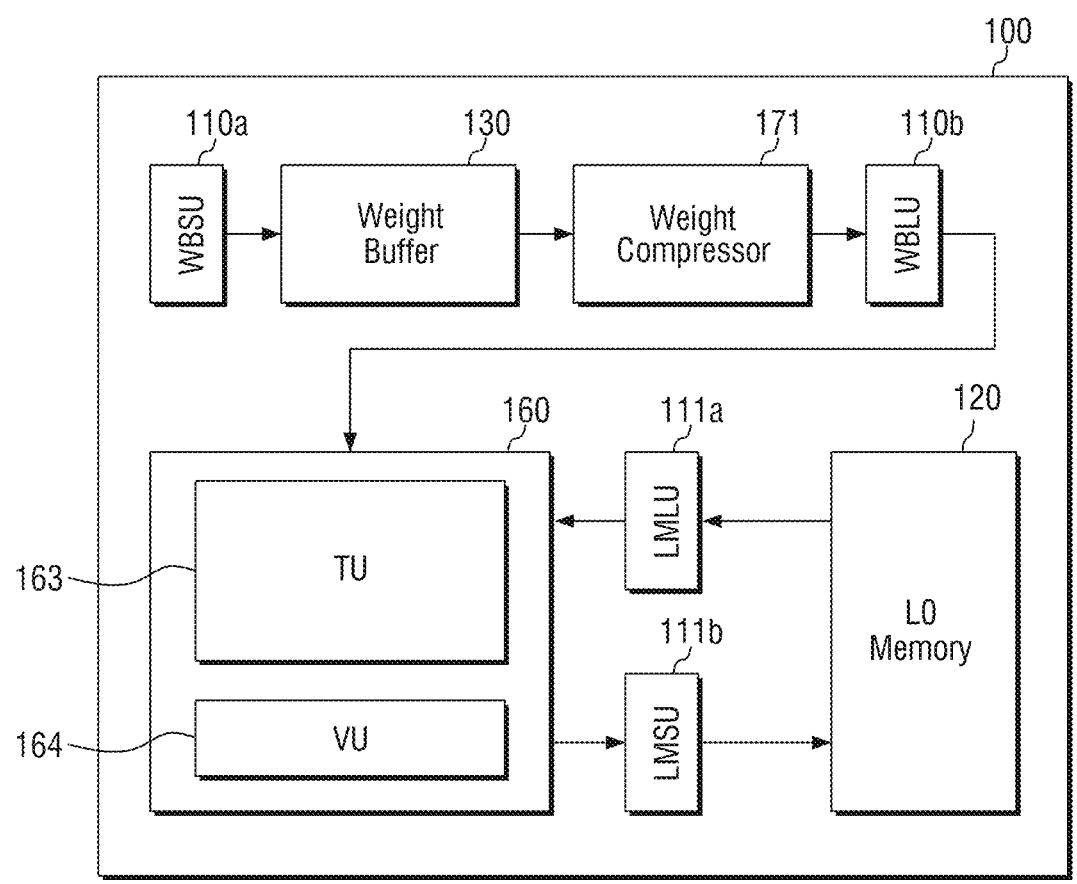
FIG. 32 is a diagram for illustrating in detail the structure of a neural core in accordance with some embodiments of the disclosure.

FIG. 32 is a diagram for illustrating in detail the structure of a neural core in accordance with some embodiments of the disclosure.

Referring to FIG. 32, a neural core 100 may include a weight buffer store unit 110a, a weight buffer load unit 110b, a local memory load unit 111a, a local memory store unit 111b, a L0 memory 120, a weight buffer 130, a processing unit 160, and a weight compressor 171.

The weight buffer store unit 110a may provide a weight matrix to be calculated in the processing unit 160 to the weight buffer 130. The weight buffer 130 may temporarily store the weight matrix.

The weight buffer load unit 110b may load the weight matrix stored in the weight buffer 130 and provide it to the weight compressor 171. The weight compressor 171 may generate a compressed weight matrix by using the weight matrix. The weight buffer load unit 110b may provide the compressed weight matrix generated by the weight compressor 171 to the processing unit 160. The processing unit 160 may perform calculations by using the compressed weight matrix.

Figure 33:
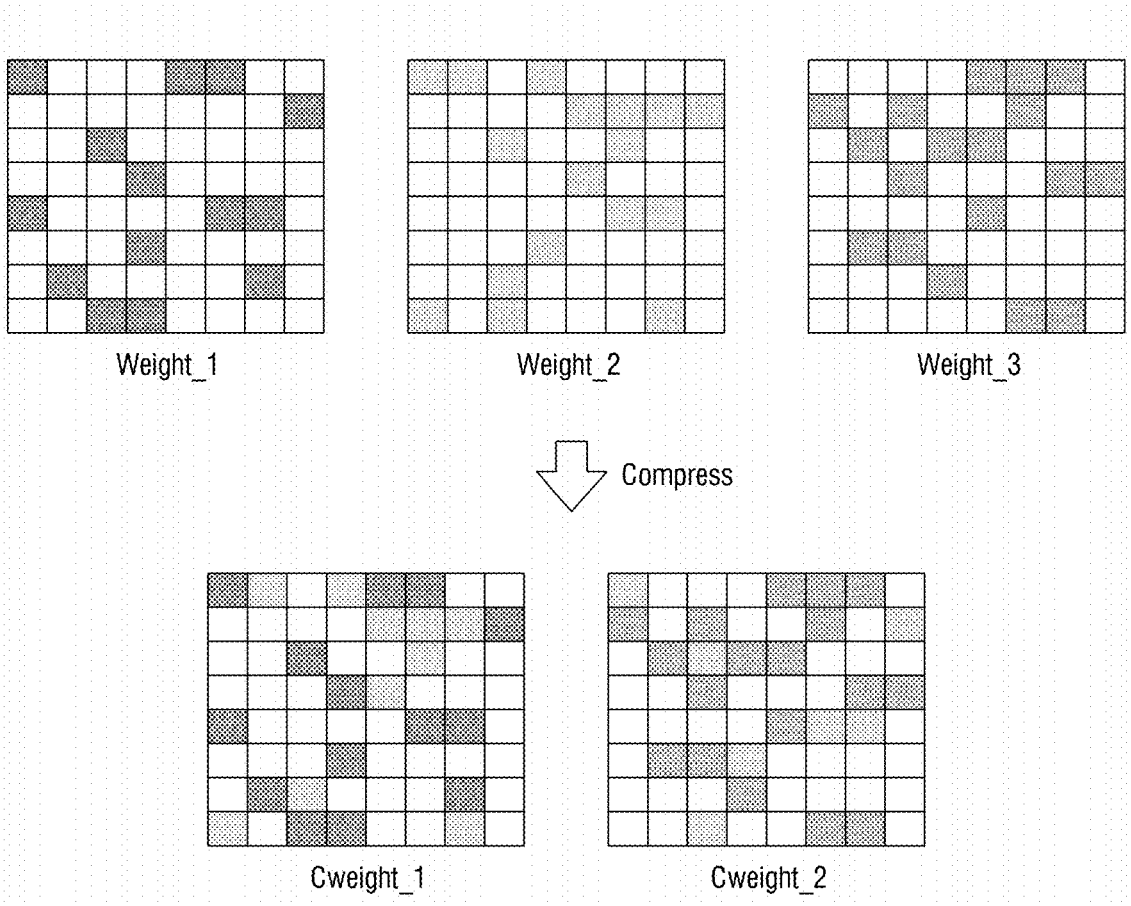
FIG. 33 is a diagram for illustrating the operation of a weight compressor in accordance with some embodiments of the disclosure.

The weight compressor 171 may generate a compressed weight matrix in a similar manner to the activation compressor 170 described above. However, the weight compressor 171 has a difference from the activation compressor 170 that compresses one-dimensional input activations in that it compresses two-dimensional weight matrices. The weight compressor 171 may generate a compressed weight matrix by repetitively performing the compression operation performed by the activation compressor 170 by each row or column. Reference is further made to FIG. 33 for an illustrative description.

FIG. 33 is a diagram for illustrating the operation of a weight compressor in accordance with some embodiments of the disclosure.

Referring further to FIG. 33, the weight compressor 171 may be provided with a first weight matrix Weight_1, a second weight matrix Weight_2, and a third weight matrix Weight_3 from the weight buffer 130. The weight compressor 171 may generate a first compressed weight matrix Cweight_1 by using the first weight matrix Weight_1 and the second weight matrix Weight_2, and may generate a second compressed weight matrix Cweight_2 by using the third weight matrix Weight_3 and at least a portion of the second weight matrix Weight_2. This may be similar to the operation of the activation compressor 170 described using FIG. 17.

However, FIG. 33 is merely for an illustrative description, and the embodiment related to the operation of the weight compressor 171 is not limited thereto. As described above, the weight compressor 171 may generate a compressed weight matrix by repetitively performing the operation of the activation compressor 170 described above, in addition to the embodiment shown in FIG. 33. Furthermore, the description of source index matrices and operation index matrices will be omitted for convenience of description. The source index matrices may be similar to the source indices described above, and the operation index matrices may be similar to the operation indices described above.

Moreover, the compression processes of the input activations Act_In and the weight matrices in accordance with some embodiments of the disclosure have been described using FIGS. 15 to 33 above, but these have merely described some embodiments, and the disclosure is not limited thereto. The compression processes described above can be extended and applied to compress data having a particular arrangement, in addition to the input activations Act_In and the weight matrices.

Figure 34:
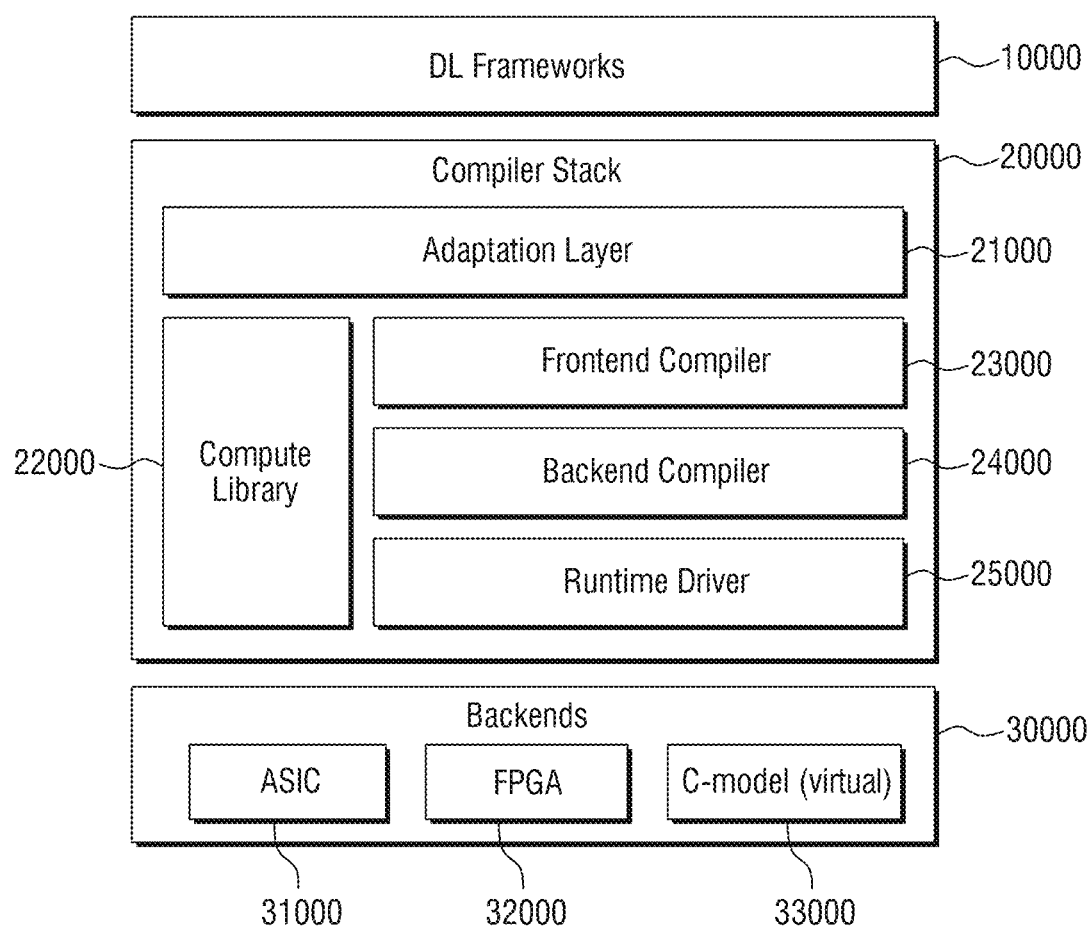
FIG. 34 is a block diagram for illustrating a software hierarchy of a neural processing device in accordance with some embodiments of the disclosure.

FIG. 34 is a block diagram for illustrating a software hierarchy of a neural processing device in accordance with some embodiments of the disclosure.

Referring to FIG. 34, the software hierarchy of the neural processing device in accordance with some embodiments may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 35:
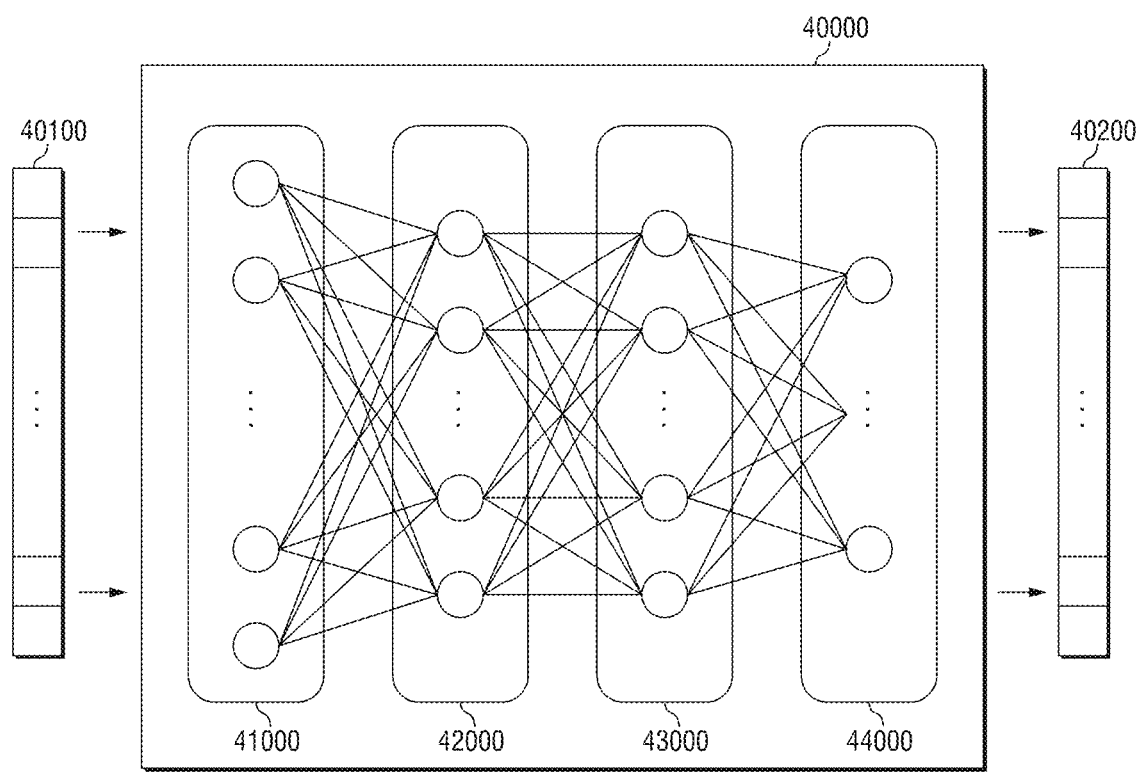
FIG. 35 is a conceptual diagram for illustrating deep learning calculations performed by a neural processing device in accordance with some embodiments of the disclosure.

FIG. 35 is a conceptual diagram for illustrating deep learning calculations performed by a neural processing device in accordance with some embodiments of the disclosure.

Referring to FIG. 35, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 35, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 36:
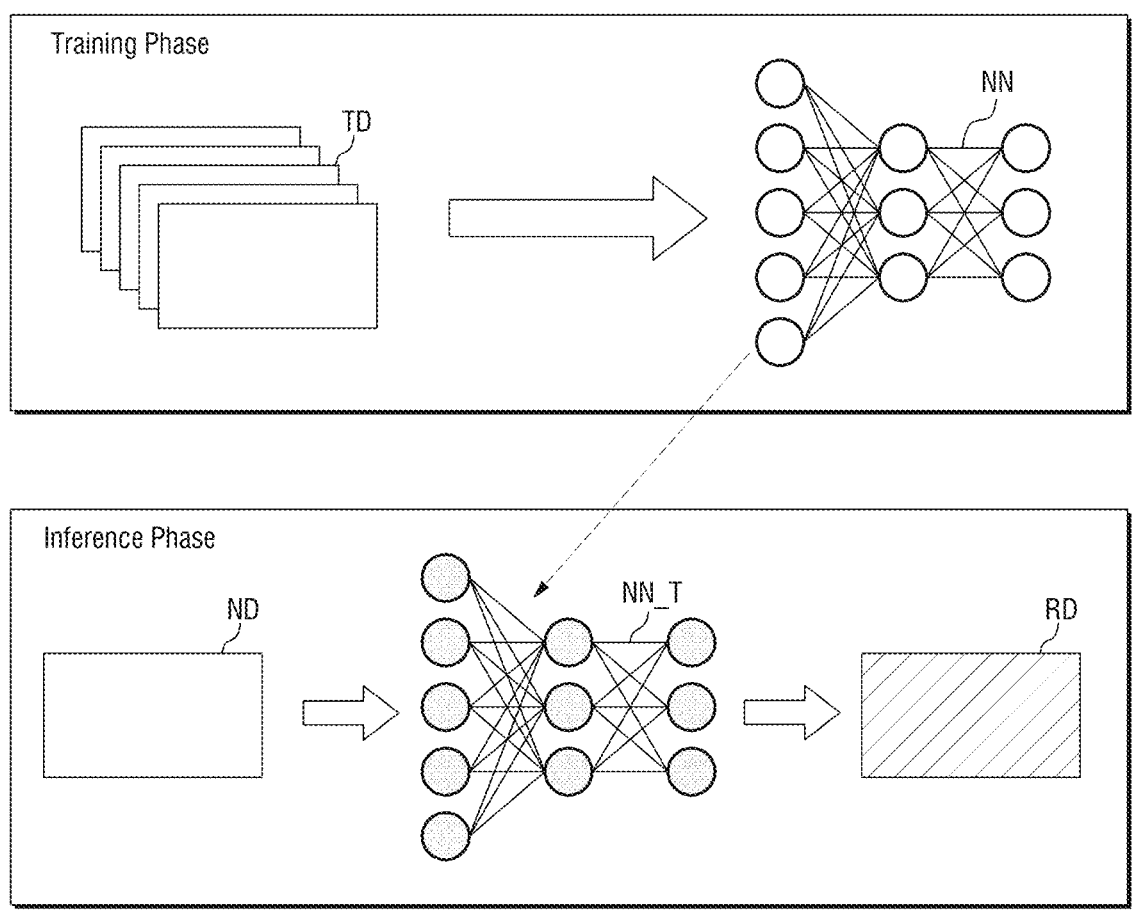
FIG. 36 is a conceptual diagram for illustrating training and inference operations of a neural network of a neural processing device in accordance with some embodiments of the disclosure.

FIG. 36 is a conceptual diagram for illustrating training and inference operations of a neural network of a neural processing device in accordance with some embodiments of the disclosure.

Referring to FIG. 36, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the invention.

What is claimed is:

1. A neural processor comprising an activation buffer in that first and second input activations are temporarily stored, wherein the neural processor is configured to:
generate a first compressed input activation by using the first and second input activations; and
perform data calculation using the first compressed input activation,
wherein the first compressed input activation comprises a first input row data and a first metadata associated with the first input row data,
the first input row data comprises first and second data elements,
the first metadata comprises first and second source elements,
the first source element is associated with the first data element and the first input activation,
the second source element is associated with the second data element and the second input activation, and
wherein the first source element comprises information indicating that the first data element has originated from the first input activation, and the second source element comprises information indicating the second data element has originated from the second input activation.

2. The neural processor of claim 1, wherein the first metadata further comprises a first operation index comprising information for a weight that is calculated with the first input row data.

3. The neural processor of claim 2, wherein the first operation index comprises first and second operation elements, and wherein the first operation element is associated with the first data element, and the second operation element is associated with the second data element.

4. The neural processor of claim 2, wherein the first operation element comprises information for a first weight element that is calculated with the first data element, and the second operation element comprises information for a second weight element that is calculated with the second data element.

5. The neural processor of claim 1, wherein the first input activation comprises a first input element that is an effective element and a second input element that is an ineffective element, and the second input activation comprises a third input element that is an effective element,
wherein generating the first input row data comprises pushing the third input element to the second input element.

6. The neural processor of claim 5, wherein the first data element corresponds to the first input element, and the second data element corresponds to the third input element.

7. The neural processor of claim 5, wherein a location of the second data element does not correspond to a location of the third input element.

8. The neural processor of claim 5, wherein generating the first input row data comprises sequentially pushing the third input element to the second input element.

9. The neural processor of claim 1, wherein the first and second source elements have different value each other.

10. The neural processor of claim 1, wherein a location of the first source element corresponds to a location of the first data element, and a location of the second source element corresponds to a location of the second data element.

11. The neural processor of claim 1, wherein the neural processor is further configured to:
generate a first preliminary input row data by using the first and second input activations,
generate a second input row data and a second preliminary input row data by using third and fourth input activations, and
generate a third input row data by using the first and second preliminary input row data.

12. The neural processor of claim 11, wherein the first and second preliminary input row data is temporarily stored until the third input row data is generated.

13. The neural processor of claim 1, wherein the neural processor is further configured to generate a first compressed weight matrix by using first and second weight matrices, and
wherein the first compressed weight matrix comprises at least a portion of the first weight matrix and at least a portion of the second weight matrix.

14. A neural processor comprising an activation buffer in that first and second input activations are stored,
wherein the neural processor is configured to:
generate a first compressed input activation by using the first and second input activations; and
perform 2-dimensional calculation using the first compressed input activation,
wherein the first compressed input activation comprises a first input row data and a first metadata, and
wherein the first input row data comprises at least a portion of the first input activation and at least a portion of the second input activation, the first metadata comprises a first source index, and the first source index comprises a first index indicating that a first data element has originated from the first input activation and a second index indicating that a second data element has originated from the second input activation.

15. The neural processor of claim 14, wherein the first source index comprises information that elements included in the first input row data hashave originated from one of the first and second input activations.

16. The neural processor of claim 15, wherein the first input row data comprises first and second data elements, and the first source index comprises first and second source elements,
wherein the first data element corresponds to the first source element and the second data element corresponds to the second source element, and
wherein the first source element has a value of the first index and the second source element has a value of the second index.

17. The neural processor of claim 14, wherein the processor is further configured to:
generate a first preliminary input activation by using remaining data after generating the first compressed input activation,
store third and fourth input activation,
generate a second compressed input activation and a second preliminary input activation by using the third and fourth input activation, and
generate a third compressed input activation by using the first and second preliminary input activations.

18. The neural processor of claim 14, wherein the first input activation comprises a first input element that is an effective element and a second input element that is an ineffective element, and the second input activation comprises a third input element that is an effective element,
wherein generating the first input row data comprises pushing the third input element to the second input element.

19. A data processing method performed in a neural core included in a neural processor is comprising:
temporarily storing first and second input activations;
generating a first compressed input activation by using the first and second input activations; and
performing data calculation using the first compressed input activation,
wherein the first compressed input activation comprises a first input row data comprising first and second data elements and a first metadata comprising information that the first data element has originated from the first input activation and the second data element has originated from the second input activation.

* * * * *